United States Patent
Cho et al.

(10) Patent No.: US 10,613,677 B2
(45) Date of Patent: Apr. 7, 2020

(54) TOUCHSCREEN DEVICE WITH INTEGRATED FINGERPRINT SENSOR

(71) Applicant: LG DISPLAY CO., LTD., Seoul (KR)

(72) Inventors: Jiho Cho, Seoul (KR); Kyoseop Choo, Suwon-si (KR); Manhyeop Han, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 19 days.

(21) Appl. No.: 15/789,852

(22) Filed: Oct. 20, 2017

(65) Prior Publication Data

US 2018/0113558 A1   Apr. 26, 2018

(30) Foreign Application Priority Data

Oct. 25, 2016   (KR) ........................ 10-2016-0139279

(51) Int. Cl.
*G06F 3/041* (2006.01)
*G06F 3/044* (2006.01)
*G06K 9/00* (2006.01)

(52) U.S. Cl.
CPC ............ *G06F 3/0416* (2013.01); *G06F 3/044* (2013.01); *G06K 9/0002* (2013.01); *G06F 2203/04103* (2013.01); *G06F 2203/04106* (2013.01)

(58) Field of Classification Search
CPC ...... G06F 3/0416; G06F 3/044; G06K 9/0002
See application file for complete search history.

(56) References Cited

U.S. PATENT DOCUMENTS

| | | | |
|---|---|---|---|
| 8,564,314 B2 | 10/2013 | Shaihk et al. | |
| 2007/0109274 A1* | 5/2007 | Reynolds | G06F 3/041 345/173 |
| 2012/0182253 A1* | 7/2012 | Brosnan | G06F 3/0416 345/174 |
| 2013/0135247 A1* | 5/2013 | Na | G06F 21/32 345/174 |
| 2013/0307818 A1 | 11/2013 | Pope et al. | |
| 2014/0300574 A1* | 10/2014 | Benkley, III | G06K 9/00013 345/174 |
| 2014/0354556 A1* | 12/2014 | Alameh | G06F 21/32 345/173 |

FOREIGN PATENT DOCUMENTS

KR   10-1432988   8/2014

* cited by examiner

*Primary Examiner* — Ram A Mistry
(74) *Attorney, Agent, or Firm* — Seed IP Law Group LLP

(57) ABSTRACT

The present disclosure provides a touchscreen device with an integrated fingerprint sensor. The touchscreen device including a touchscreen having a touch area for touch sensing and a fingerprint and touch area for touch sensing and fingerprint sensing, the touch area having Tx electrodes arranged in a first direction and Rx electrodes arranged in a second direction, and the fingerprint and touch area having FTx electrodes arranged in the first direction and FRx electrodes arranged in the second direction, and a touch IC that performs touch sensing through the touch area and the fingerprint and touch area and performs fingerprint sensing through the fingerprint and touch area, wherein the Rx electrodes form a plurality of groups, and the groups are individually and separately connected to Rx lines in the boundary region between the touch area and the fingerprint and touch area.

20 Claims, 20 Drawing Sheets

(a)

(b)

TOUCHSCREEN DEVICE WITH INTEGRATED FINGERPRINT SENSOR

This application claims priority to and the benefit of Korean Patent Application No. 10-2016-0139279 filed on Oct. 25, 2016, which is incorporated herein by reference for all purposes as if fully set forth herein.

BACKGROUND

Technical Field

The present disclosure relates to a touchscreen device with an integrated fingerprint sensor.

Description of the Related Art

With the advance of computer technology, computer-based systems for various purposes, such as laptop computers, tablet PCs, smartphones, personal digital assistants, automated teller machines, search guidance systems, etc., have been developed. These systems usually store a lot of confidential data such as business information or trade secrets, as well as personal information about the private lives of individuals, there is a need to strengthen security to protect such data.

To this end, fingerprint sensors have been conventionally used which can strengthen security by registering or authenticating with a system via fingerprint. A fingerprint sensor is a sensor that detects a human fingerprint. Fingerprint sensors are broadly categorized into optical fingerprint sensors and capacitive fingerprint sensors.

An optical fingerprint sensor internally illuminates a fingerprint using a light source such as LED (light-emitting diode) and detects light reflected by the ridges of the fingerprint by a CMOS image sensor. The optical fingerprint sensor is limited in terms of size reduction since it involves fingerprint scanning using an LED, and its manufacturing cost is high because the light source is expensive.

The capacitive fingerprint sensor uses the difference in electric charge between the ridges and valleys touching the fingerprint sensor.

A known example of the related art capacitive fingerprint sensor is U.S. Laid-Open Patent Application No. US2013/0307818 filed on Nov. 21, 2013, entitled "Capacitive Sensor Packaging". The capacitive fingerprint sensor disclosed in this U.S. Laid-Open Patent Application is an assembly with a particular push button attached to it, and comprises a silicon wafer, imprinted with a circuit for measuring the capacitance between a capacitive plate and the user's fingerprint (including the ridges and valleys).

In general, the ridges and valleys of a human fingerprint are very thin, ranging from 300 μm to 500 μm. Thus, the capacitive fingerprint sensor disclosed in the above U.S. Laid-Open Patent Application requires the manufacture of a high-resolution sensor array and an IC (integrated circuit) for fingerprint recognition, and uses a silicon wafer onto which the sensor array and the IC can be integrated together. However, integrating the high-resolution sensor array and the IC together using the silicon wafer requires an assembly structure for attaching the push button and the fingerprint sensor together. This makes the configuration complicated and increases the size of a non-display area, a.k.a., bezel. Moreover, the push button (e.g., the home key on a smartphone) doubles as a fingerprint sensor, which leads to an increase in thickness and makes the fingerprint sensing area dependent on the size of the push button.

To solve these problems, technologies have been developed, such as the technology of using part of a touch sensor screen as a fingerprint identification area. Examples of this technology include U.S. Pat. No. 8,564,314 filed on Oct. 22, 2013, entitled "Capacitive touch sensor for identifying a fingerprint" and Korean Patent Registration No. 10-1432988 filed on Aug. 18, 2014, entitled "Capacitive touchscreen with integrated fingerprint recognition".

FIG. 1 is a plan view schematically showing an array of driving electrodes and sensing electrodes on a conventional capacitive sensing panel. FIG. 2 is a view showing a configuration of a conventional touchscreen device with an integrated fingerprint sensor. FIG. 3A is a view showing mutual capacitance that occurs in a typical touch sensor pattern. FIG. 3B is a view showing mutual capacitance that occurs in a high-density sensor pattern.

Referring to FIG. 1, the capacitive touch sensor for identifying a fingerprint comprises a touch sensor 3 comprising a touch driving electrode $1(x)$ and a touch sensing electrode $1(y)$, and a fingerprint sensor 5 comprising a fingerprint driving electrode $5(x)$ and a fingerprint sensing electrode $5(y)$. In this capacitive touch sensor for identifying a fingerprint, a dedicated fingerprint sensor 5 is placed in a part of the screen area, so touch does not work on the area of the fingerprint sensor 5 and the touch performance is low in the area around the fingerprint sensor 5.

Referring to FIG. 2, the capacitive touchscreen with integrated fingerprint recognition comprises a touch panel AA, electrode connecting lines BB, and a touch controller CC. In this configuration, the touch panel AA has tiny channels A3 formed by a combination of first channel electrodes A1 (either Tx or Rx) and second channel electrodes A2 (the remaining ones Tx or Rx) arranged to intersect each other. The tiny channels A3, except those in the area of a fingerprint recognition sensor A4, are grouped together in numbers and function as touch group channels A5 for touch signal detection, and the tiny channels A3 corresponding to the area of the fingerprint recognition sensor A4 function as fingerprint recognition channels A6. However, in the touchscreen device with integrated fingerprint recognition, since the tiny channels (touch channels) function as the touch group channels A5, the mutual capacitance Cm between the touch channels increases considerably. That is, in the high-density sensor pattern of FIG. 3B, the mutual capacitance Cm between the touch channels may be several tens to hundreds of times higher than the typical touch sensor pattern of FIG. 3A. That is, an increase in mutual capacitance lowers the sensitivity of the touch sensor, and this may lead to glitches such as failing to recognize touch when a touch action occurs.

BRIEF SUMMARY

An example embodiment of the present disclosure provides a touchscreen device with an integrated fingerprint sensor, the touchscreen device comprising: a touchscreen having a touch area for touch sensing and a fingerprint and touch area for touch sensing and fingerprint sensing, the touch area having Tx electrodes arranged in a first direction and Rx electrodes arranged in a second direction, and the fingerprint and touch area having FTx electrodes arranged in the first direction and FRx electrodes arranged in the second direction; and a touch IC that performs touch sensing through the touch area and the fingerprint and touch area and performs fingerprint sensing through the fingerprint and touch area, wherein the Rx electrodes form a plurality of groups, and the groups are individually and separately connected to Rx lines in the boundary region between the touch area and the fingerprint and touch area.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the invention. In the drawings.

DETAILED DESCRIPTION

Reference will now be made in detail to embodiments, examples of which are illustrated in the accompanying drawings.

Hereinafter, a concrete example according to an example embodiment of the present disclosure will be described with reference to the accompanying drawings.

A display device to which a touchscreen device with an integrated fingerprint sensor according to the present disclosure is applied may be implemented based on flat panel displays such as a liquid crystal display (LCD), a field emission display (FED), a plasma display panel (PDP), an organic light-emitting display (OLED), an electrophoresis display (EPD), etc. It should be noted that, although the following embodiment will be described with respect to a liquid crystal display, the display device of this disclosure is not limited to the liquid crystal display. When it is deemed that a detailed description of well-known functions or configurations related to the present disclosure may unnecessarily obscure the subject matter of the present invention, the detailed description will be omitted.

The applicant of this disclosure conducted tests to find a solution for bringing uniformity in the capacitance of a touch sensor when implementing a touchscreen device with an integrated fingerprint sensor in a display device based on a capacitive fingerprint sensor. A test example will be described below.

In the description below, Tx electrodes and FTx electrodes are driving electrodes arranged in a first direction to supply signals, and Rx electrodes and FRx electrodes are sensing electrodes arranged in a second direction to sense signals. However, it should be understood that the Tx electrodes and Rx electrodes and the FTx electrodes and FRx electrodes are named differently since they play different roles.

Test Example

Figure 1:
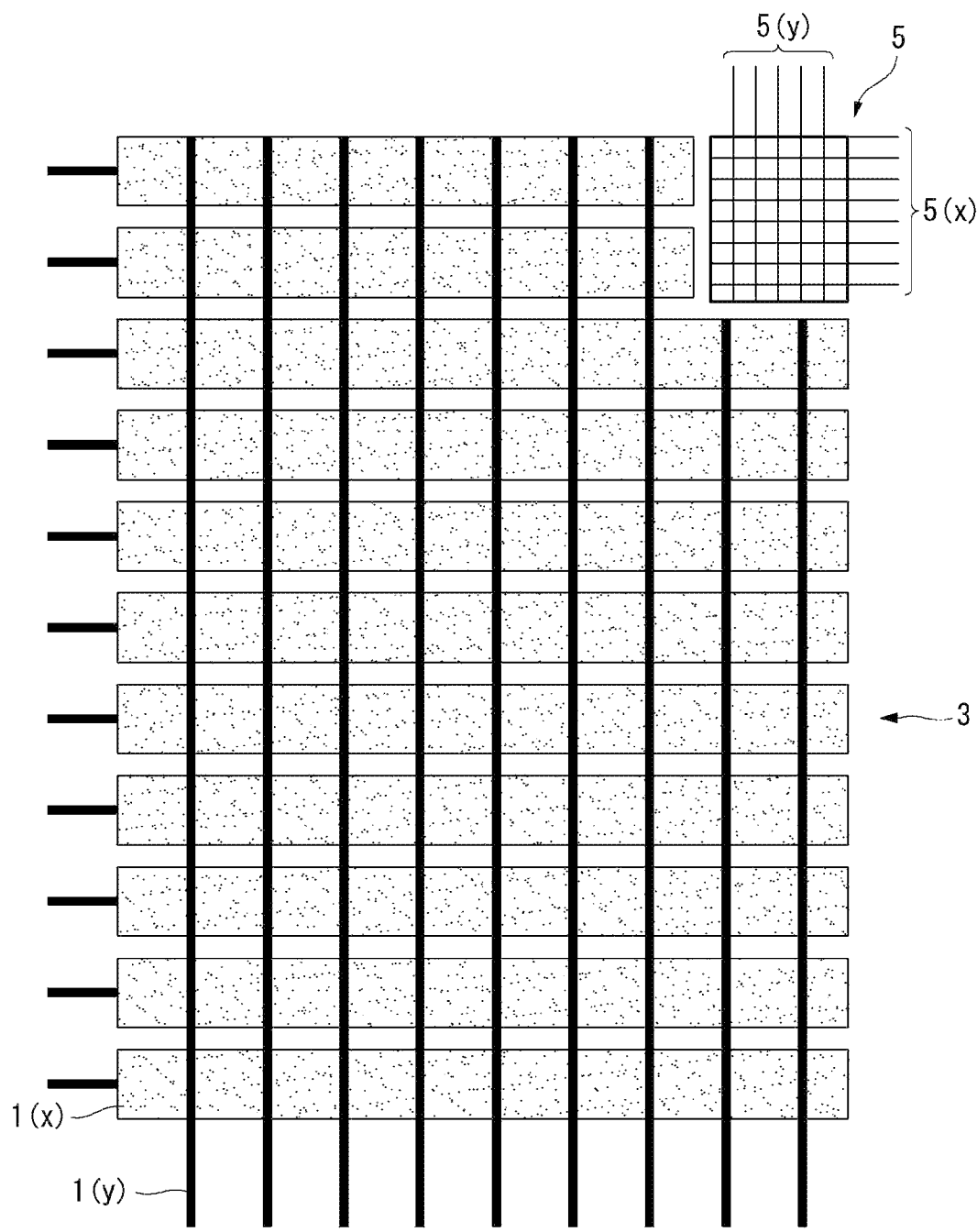
FIG. 1 is a plan view schematically showing an array of driving electrodes and sensing electrodes on a conventional capacitive sensing panel.
Figure 2:
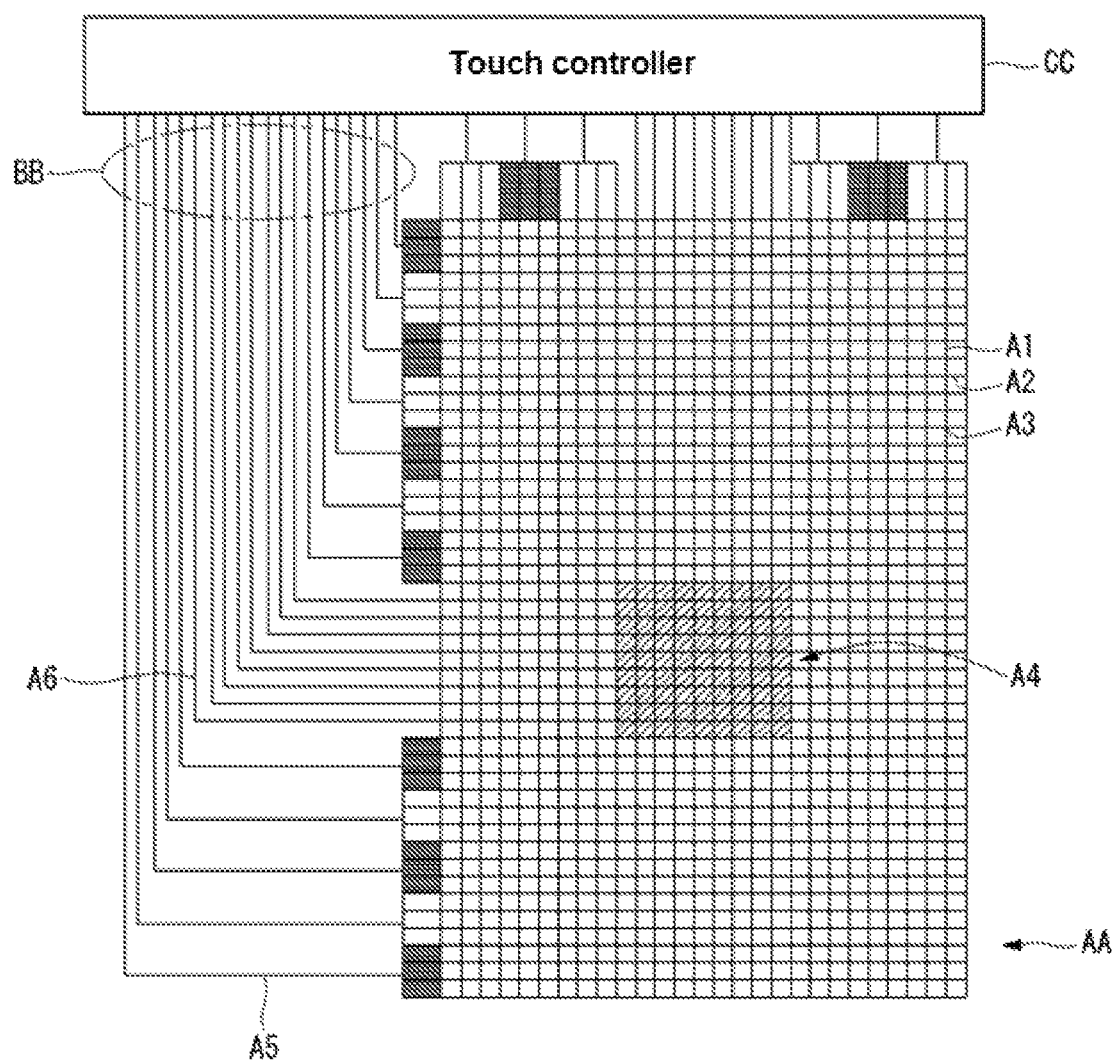
FIG. 2 is a view showing a configuration of a conventional touchscreen device with an integrated fingerprint sensor.
Figure 3A:
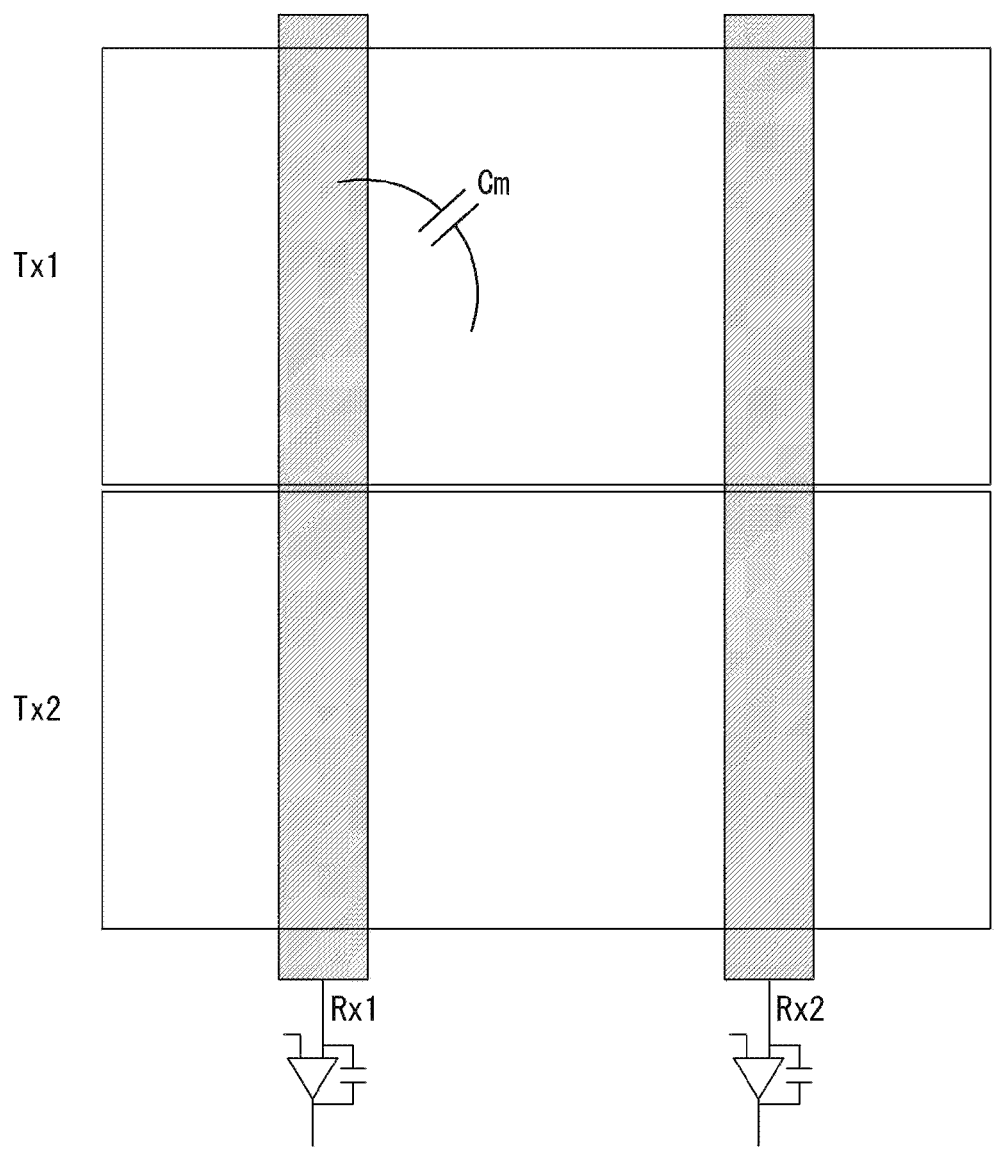
FIG. 3A is a view showing mutual capacitance that occurs in a typical touch sensor pattern.
Figure 3B:
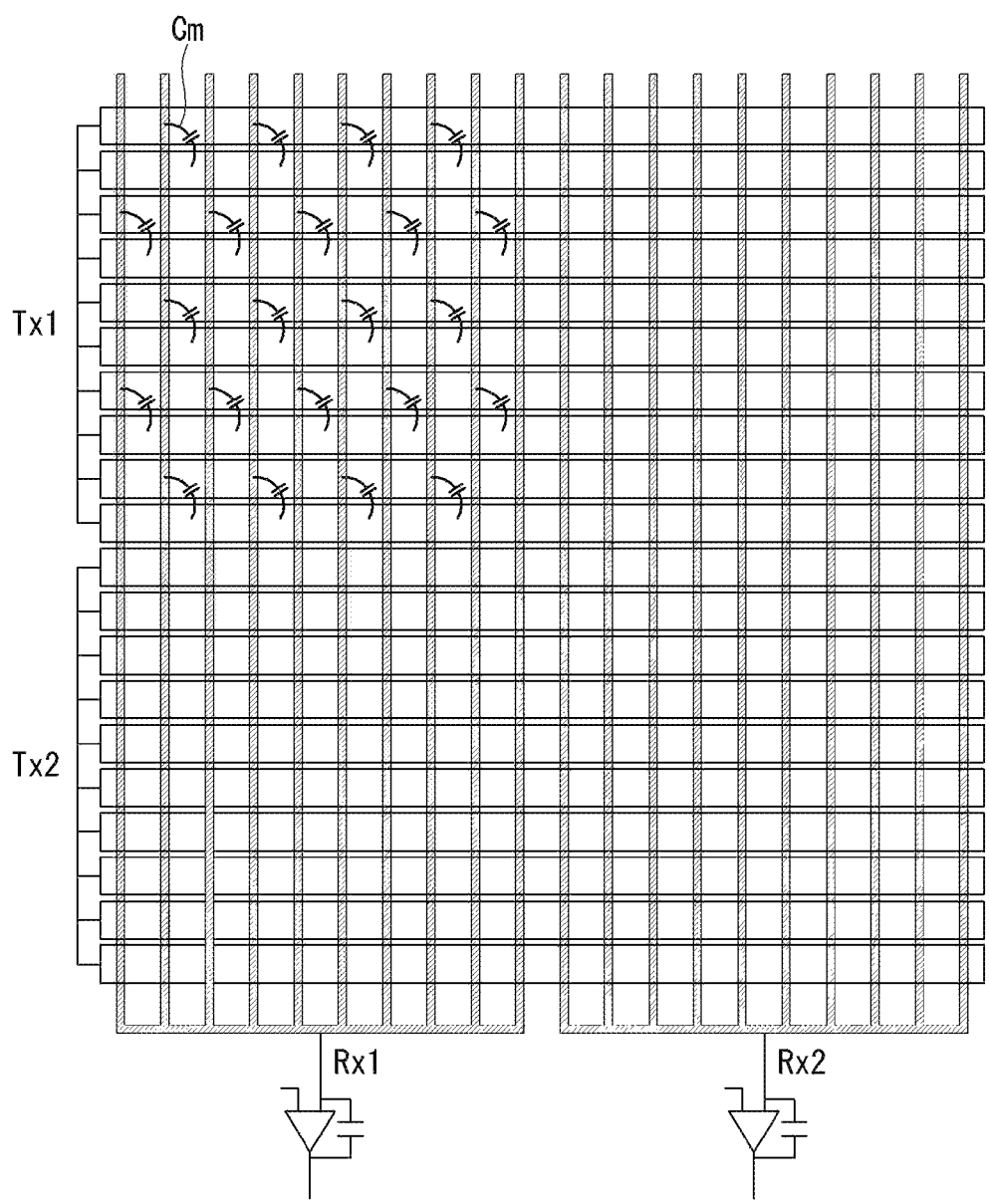
FIG. 3B is a view showing mutual capacitance that occurs in a high-density sensor pattern.
Figure 4:
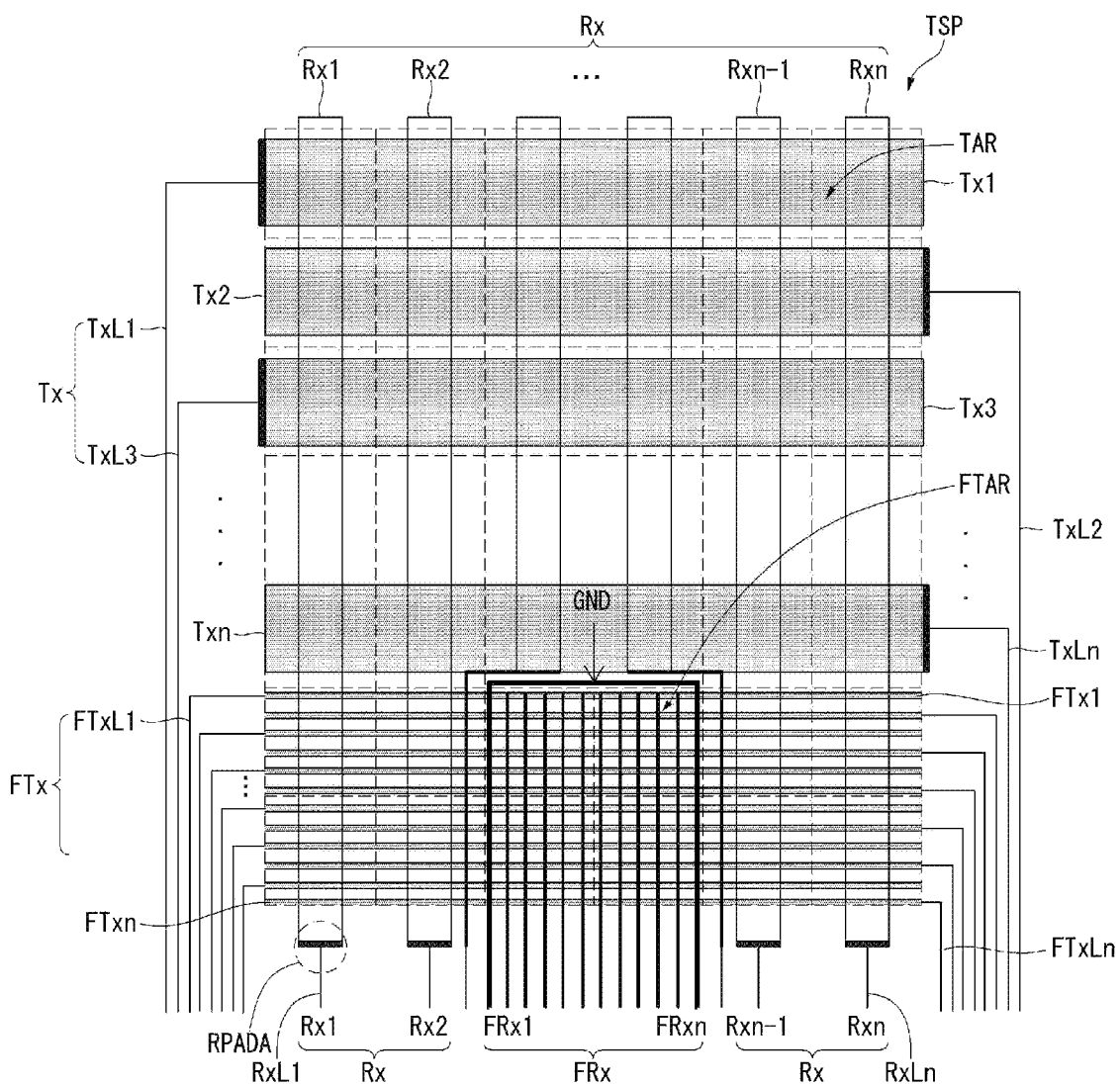
FIG. 4 is a view showing a display device to which a touchscreen device with an integrated fingerprint sensor according to a test example is applied.
Figure 5:
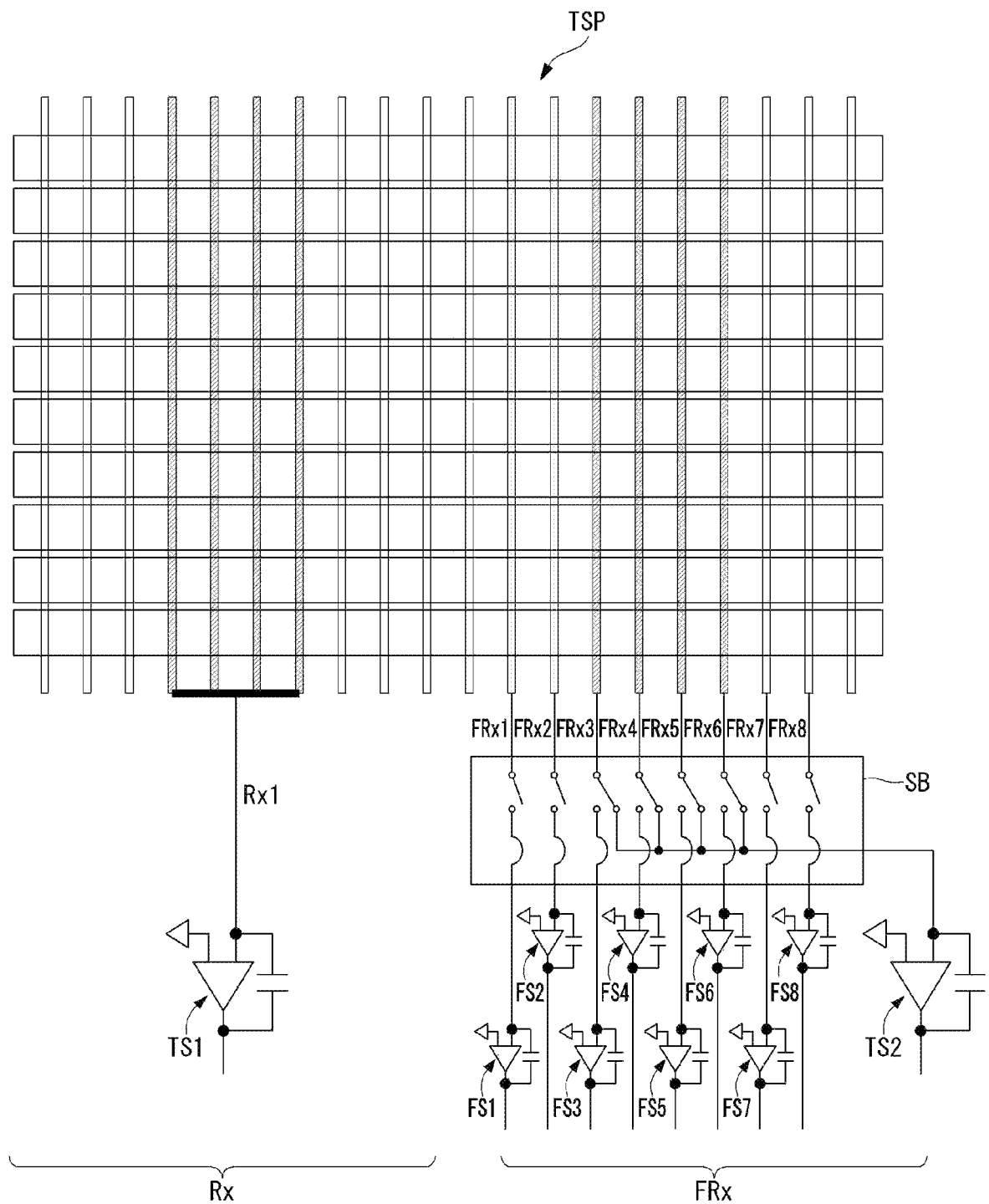
FIGS. 5 and 6 are views for explaining differences between touch sensing and fingerprint sensing according to the test example.
Figure 6:
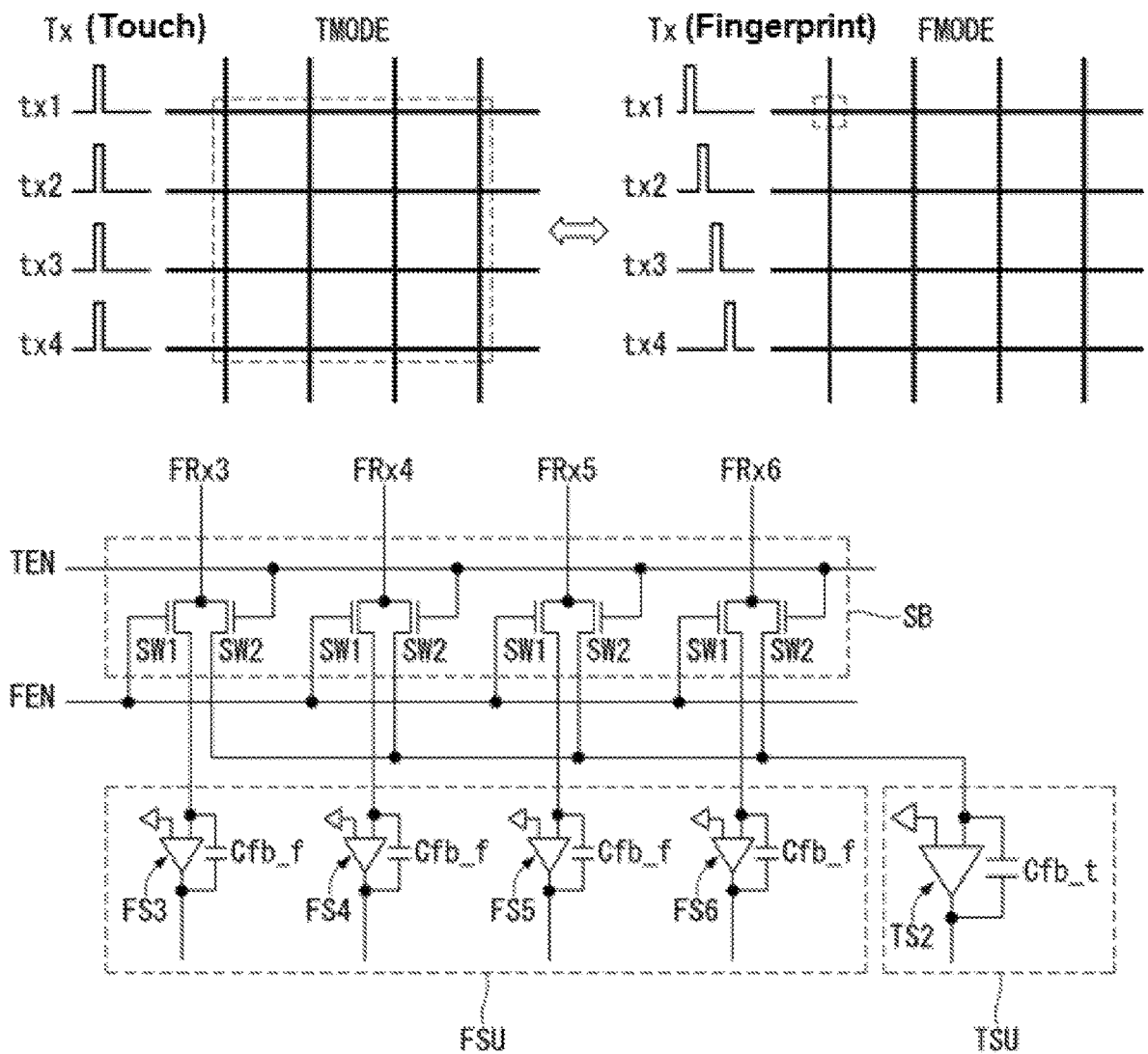
Figure 7:
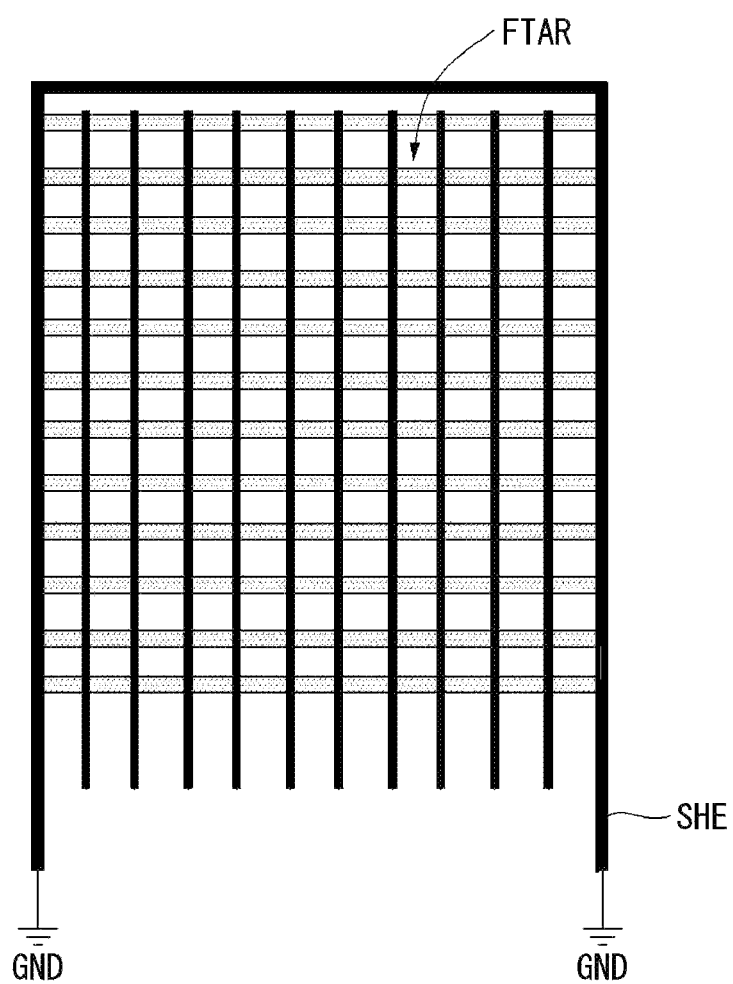
FIG. 7 is a view for explaining the structure and function of shielding electrodes shown in the test example of FIG. 4.
Figure 8:
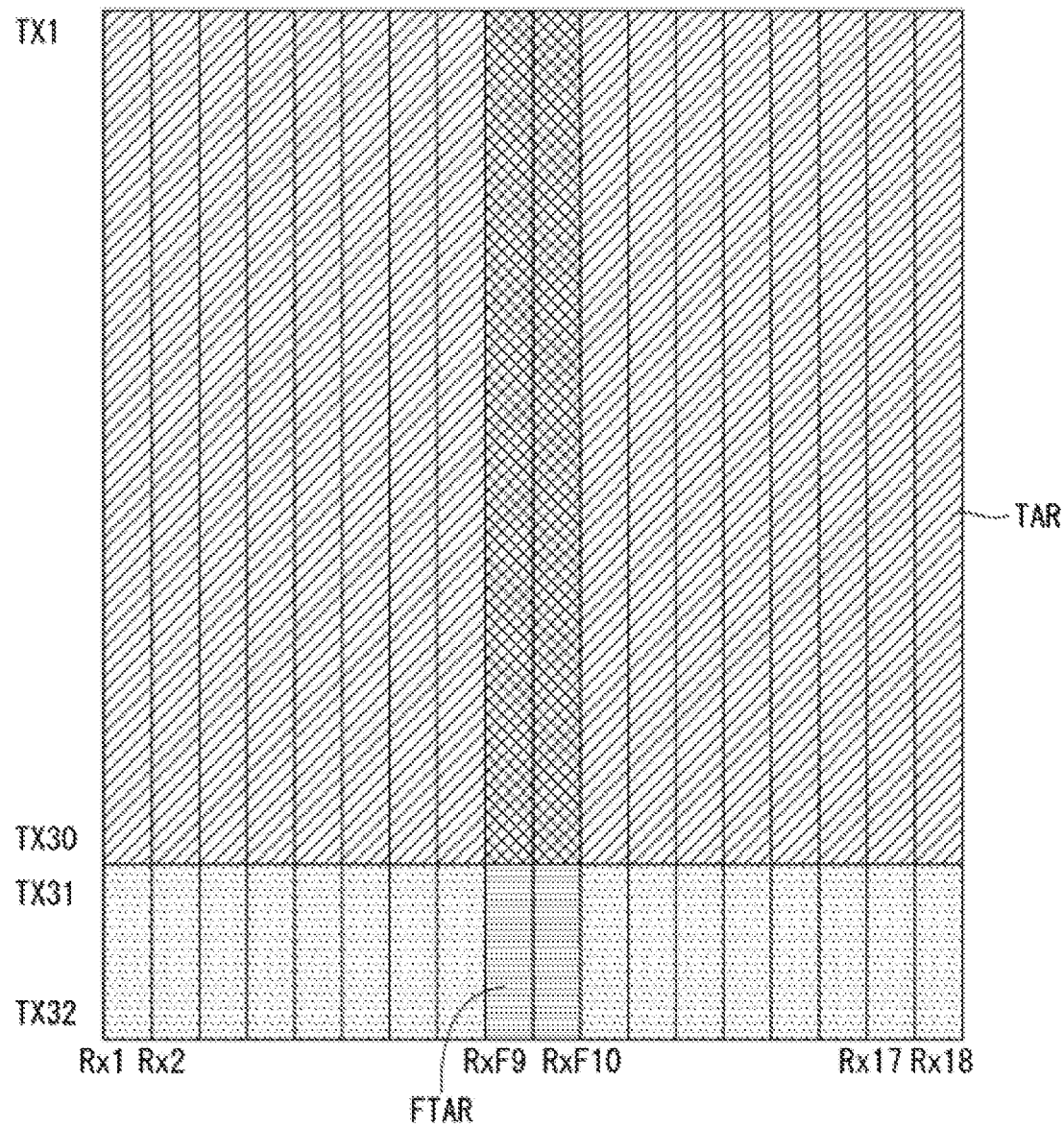
FIG. 8 is a view for explaining problems with the test example.

FIG. 4 is a view showing a display device to which a touchscreen device with an integrated fingerprint sensor according to a test example is applied. FIGS. 5 and 6 are views for explaining differences between touch sensing and fingerprint sensing according to the test example. FIG. 7 is a view for explaining the structure and function of shielding electrodes shown in the test example of FIG. 4. FIG. 8 is a view for explaining problems with the test example.

As shown in FIGS. 4 to 6, the test example shows a touchscreen device TSP with an integrated fingerprint sensor in a display device. The touchscreen device TSP with an integrated fingerprint sensor according to the test example has a touch area TAR in which only touch sensing occurs and a fingerprint and touch area FTAR in which touch sensing and fingerprint sensing occur selectively.

Tx electrodes TX1 to Txn and Rx electrodes Rx1 to Rxn arranged in the touch area TAR and FTx electrodes FTx1 to FTxn and FRx electrodes FRx1 to FRxn arranged in the fingerprint and touch area FTAR are formed in a high-density electrode pattern.

The Tx electrodes TX1 to Txn and Rx electrodes Rx1 to Rxn correspond to touch sensing electrodes Tx and Rx, and the FTx electrodes FTx1 to FTxn and FRx electrodes FRx1 to FRxn correspond to fingerprint and touch sensing electrodes FTx and FRx.

The Tx electrodes TX1 to Txn and Rx electrodes Rx1 to Rxn are respectively connected to channels of a touch IC via Tx lines TxL1 to TxLn and Rx lines RxL1 to RxLn, and the FTx electrodes FTx1 to FTxn and FRx electrodes FRx1 to FRxn are respectively connected to the channels of the touch IC via FTx lines FTxL1 to FTxLn and FRx lines FRxL1 to FRxLn. While the Rx electrodes Rx1 to Rxn and the FRx electrodes FRx1 to FRxn are formed of tiny electrodes, the Rx electrodes Rx1 to Rxn form a plurality of groups in a pad area PRADA, and the groups are individually and separately connected to the Rx lines RxL1 to RxLn.

The Tx electrodes Tx1 to Txn and Rx electrodes Rx1 to Rxn arranged in the touch area TAR do not require as high a resolution as required for fingerprint sensing. Thus, the Tx electrodes Tx1 to Txn and Rx electrodes Rx1 to Rxn arranged in the touch area TAR form groups for different areas, and the group of electrodes in the same area are simultaneously driven and sensed. Because of the above operation, the power consumption and touch report rate of the touchscreen device TSP with an integrated fingerprint sensor are reduced.

The 1Tx electrode Tx1 shown in the drawing represents a group of tiny electrodes. Like the 1Tx electrode Tx1, each of the Tx electrodes Tx1 to Txn and Rx electrodes Rx1 to Rxn arranged in the touch area TAR represents a group of tiny electrodes. As shown in FIG. 5, when performing touch sensing, a single touch sensing part TS1 senses an Rx electrode Rx which is a group of touch sensing electrodes.

In contrast, the FTx electrodes FTx1 to FTxn and FRx electrodes FRx1 to FRxn arranged in the fingerprint and touch area FTAR perform fingerprint sensing or touch sensing. When performing touch sensing, the FTx electrodes FTx1 to FTxn and FRx electrodes FRx1 to FRxn arranged in the fingerprint and touch area FTAR form groups for different areas, and the group of electrodes in the same area are simultaneously driven and sensed. As shown in FIG. 5, when performing touch sensing, a single fingerprint and touch sensing part TS2 senses an FRx electrode FRx which is a group of fingerprint and touch sensing electrodes.

When performing fingerprint sensing, the FTx electrodes FTx1 to FTxn and FRx electrodes FRx1 to FRxn arranged in the fingerprint and touch area FTAR require a high resolution. Thus, they do not work in groups but are individually driven and sensed. In this way, the FTx electrodes FTx1 to FTxn and FRx electrodes FRx1 to FRxn arranged in the fingerprint and touch area FTAR are micropatterned so that many of them fit between fingerprint ridges and valleys, and perform sensing at high resolution, thereby enabling accurate fingerprint sensing. As shown in FIG. 5, when performing fingerprint sensing, a plurality of fingerprint and sensing parts FS1 to FS8 sense a plurality of FRx electrodes FRx consisting of fingerprint sensing electrodes.

As can be seen from the above, each of the fingerprint and touch sensing parts FS1 to FS8 and TS2 sensing the fingerprint and touch area FTAR sense a plurality of electrodes or a plurality of groups of electrodes by an operation of a switch block SB arranged within the touch IC.

As shown in FIG. 6, during touch sensing mode TMODE in which touch sensing is performed, the Tx electrodes are sequentially driven in groups. Due to this, the Tx electrodes belonging to the same group receive sensor driving signals tx1 to tx4 of the same waveform (same phase waveform). In contrast, during fingerprint sensing mode FMODE in which fingerprint sensing is performed, the Tx electrodes are individually and sequentially driven. Due to this, the Tx electrodes receive sensor driving signals tx1 to tx4 of sequential waveforms (sequentially delayed waveforms)

A fingerprint sensing part FSU arranged within the touch IC is enabled in response to a fingerprint enable signal FEN, and a touch sensing part TSU is enabled in response to a touch enable signal TEN. The fingerprint enable signal FEN and the touch enable signal TEN may be generated and output from a host system. The fingerprint sensing part FSU and the touch sensing part TSU have OP amps FS3 to FS6 and TS2 and sensing capacitors cfb_f and cfb_t.

When the fingerprint enable signal FEN is supplied, first switches SW1 of the switch block SB are turned on. In this case, second switches SW2 are in turned-off state. By the turn-on of the first switches SW1, the fingerprint sensing part FSU senses the Rx electrodes individually.

When the touch enable signal TEN is supplied, the second switches SW2 of the switch block SB are turned on. In this case, the first switches SW1 are in turned-off state. By the turn-on of the second switches SW1, the touch sensing part TSU senses the RX electrodes in groups. That is, the first switches SW1 and the second switches SW2 perform switching operations inversely to each other (the turn-on time and the turn-off time are reversed).

As shown in FIGS. 4 and 7, the test example shows a touchscreen device TSP with an integrated fingerprint sensor capable of touch sensing and fingerprint sensing. Although touch sensing and fingerprint sensing are possible in the test example, the coexistence of touch sensing electrodes and fingerprint sensing electrodes may cause non-uniform Cm/Cp between them. Cm denotes mutual capacitance, and Cp denotes parasitic capacitance.

In the test example, shielding electrodes SHE are formed in such a way as to surround the fingerprint and touch area FTAR, in order to solve the Cm/Cp non-uniformity problem. As in FIG. 7, the shielding electrodes SHE are connected to a ground voltage source GND. With this structure, the fingerprint and touch area FTAR and the touch area TAR may alleviate electrical interference to some extent.

However, as can be seen from FIG. 8, the test example revealed that there are a total of four sensing areas (see the parts by which Sensing Areas 1 to 4 are defined), and touch performance did not come up to expectations due to Cm/Cp non-uniformity between these areas.

A study result showed that part of the above problem is because a plurality of Rx electrodes Rx1 to Rxn work in groups and form general electrodes at the intersections with the FTx electrodes FTx1 to FTxn. Moreover, it was revealed that another part of this problem is because a plurality of Rx electrodes Rx1 to Rxn work in groups and skirt the FRx electrodes FRx1 to FRxn. That is, it was found out that, since groups of electrodes take up more space than the lines connected to them, this can increase Cp, along with electrodes or lines intersecting or adjacent to them.

Example Embodiment

Figure 9:
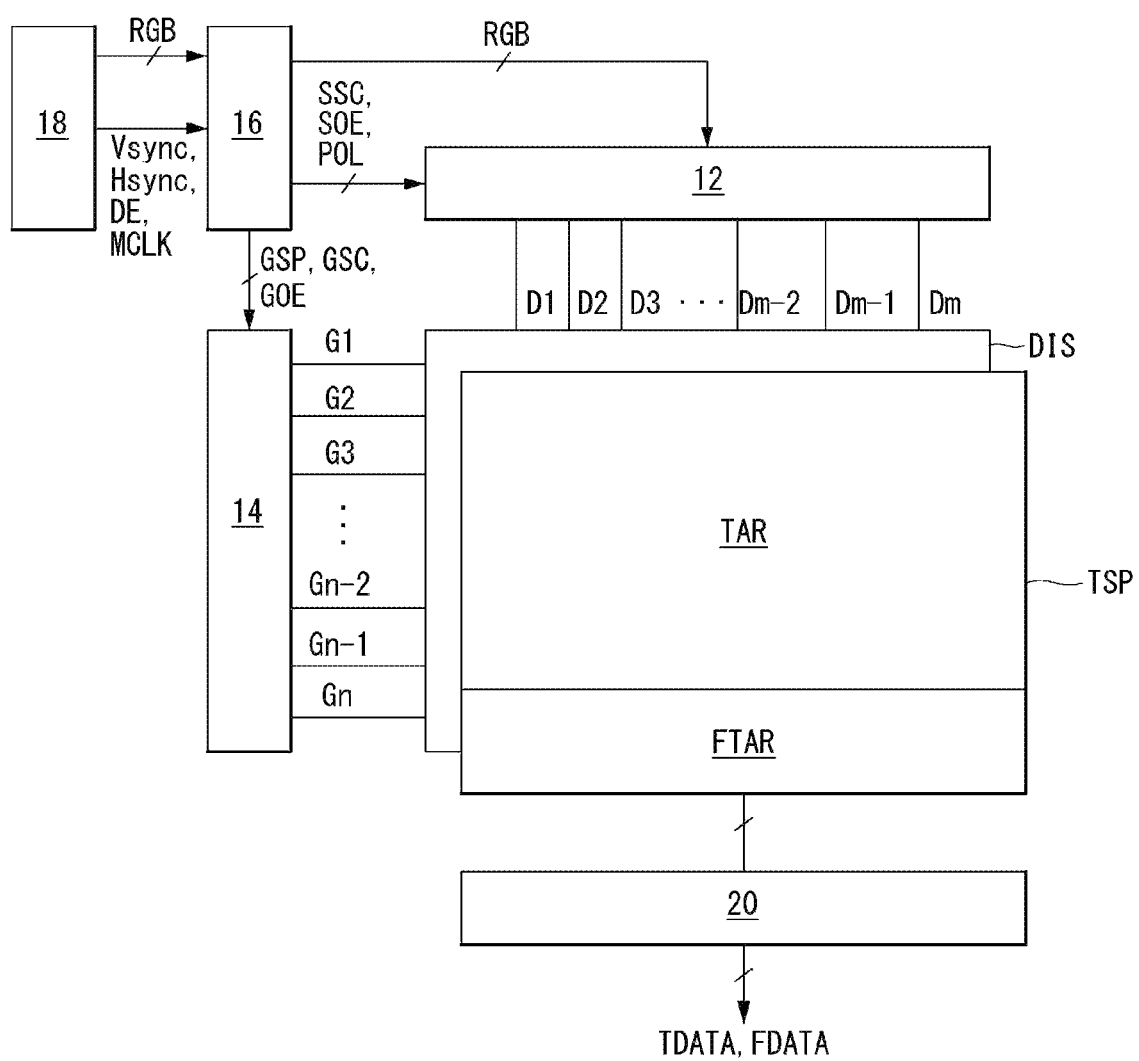
FIG. 9 is a block diagram showing a display device to which a touchscreen device with an integrated fingerprint sensor according to an example embodiment of the present disclosure is applied.
Figure 10:
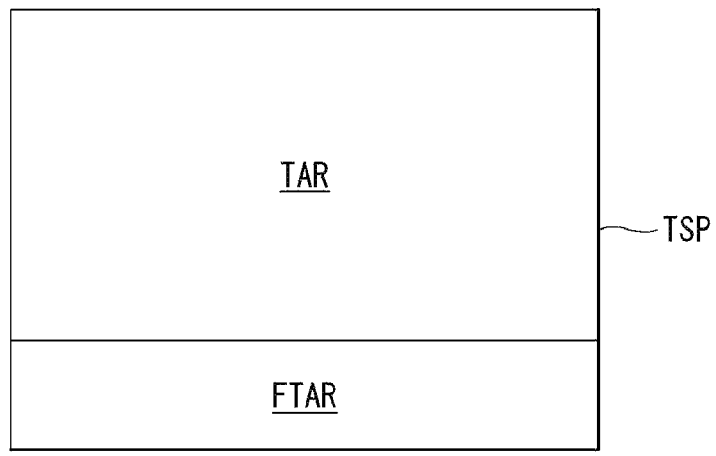
FIG. 10 is a view showing the position of a fingerprint and touch area that can be implemented on the touchscreen.
Figure 10:
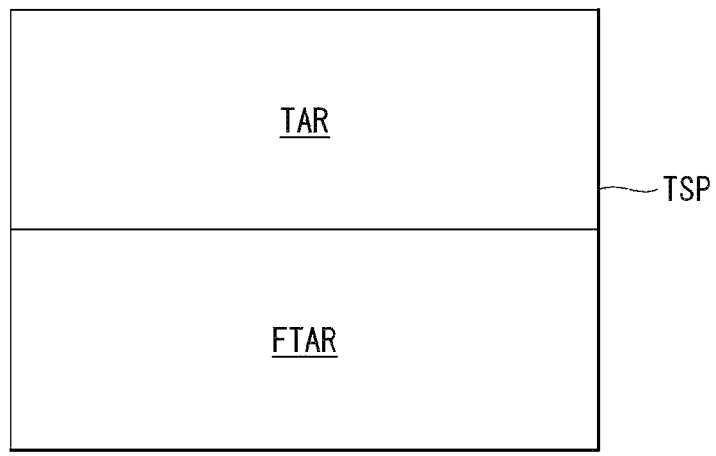
Figure 11:
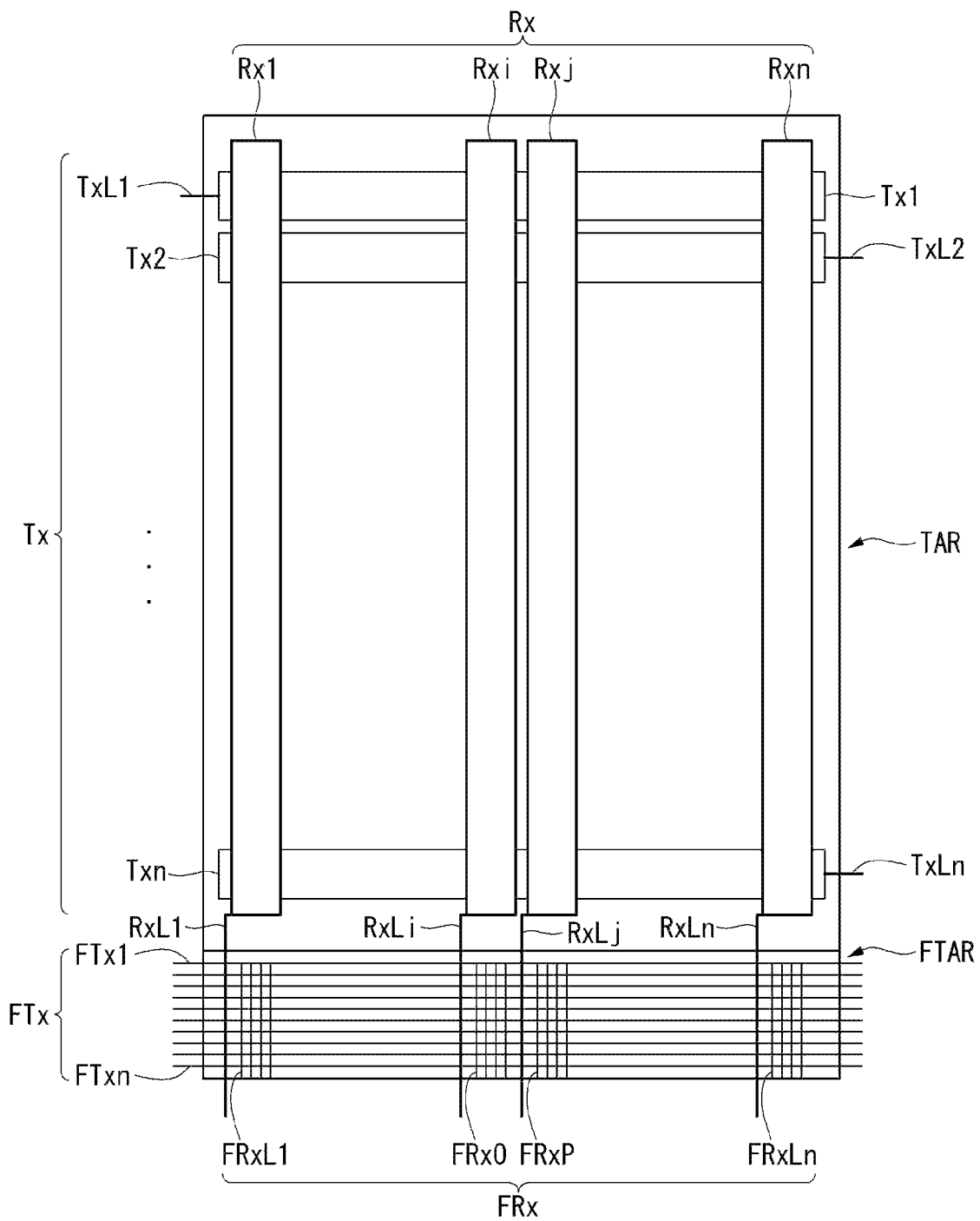
FIG. 11 is a view of the structure of electrodes in the touchscreen device with an integrated fingerprint sensor.
Figure 12:
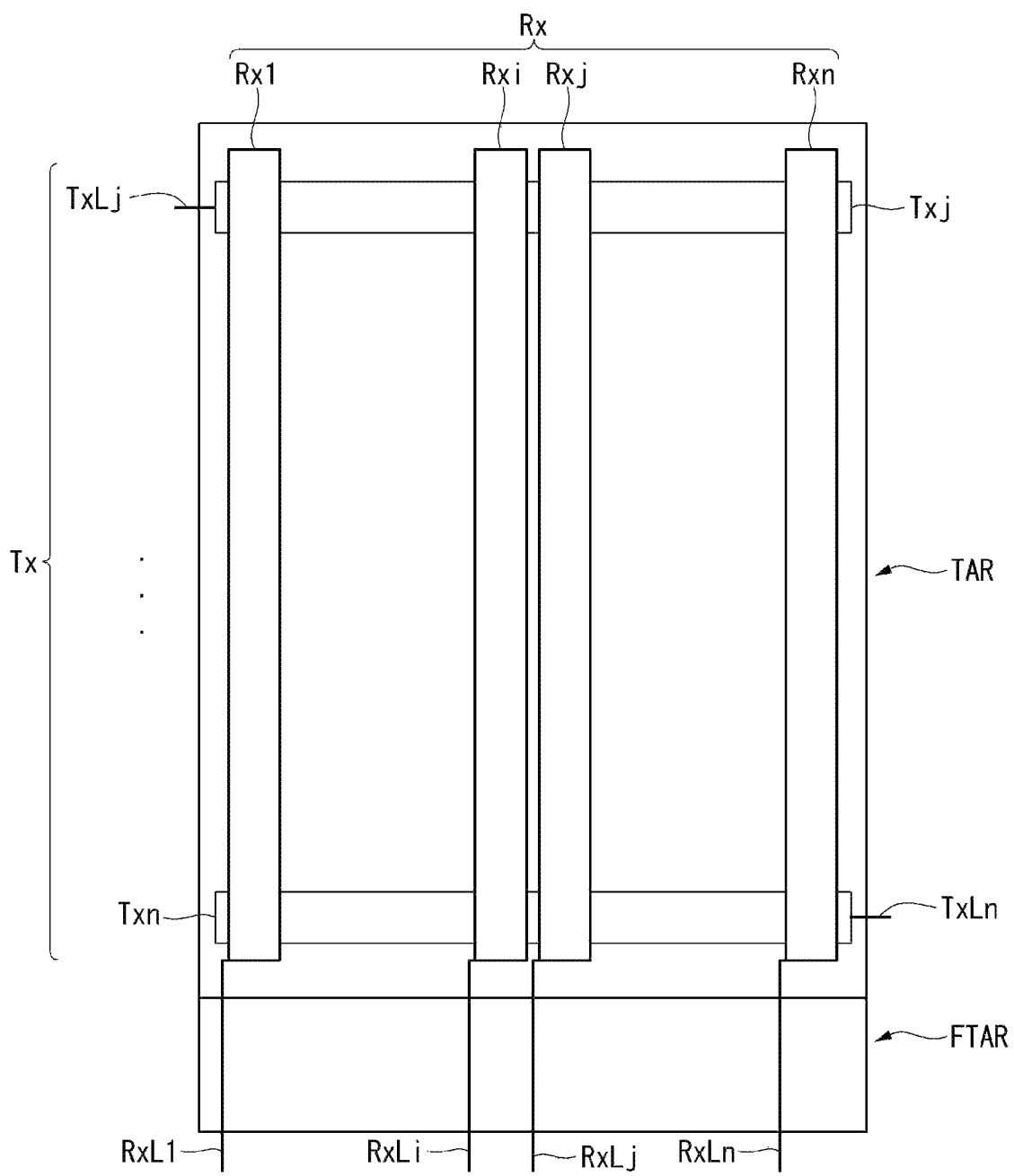
FIG. 12 is a view of the structure of electrodes with respect to a touch area.
Figure 13:
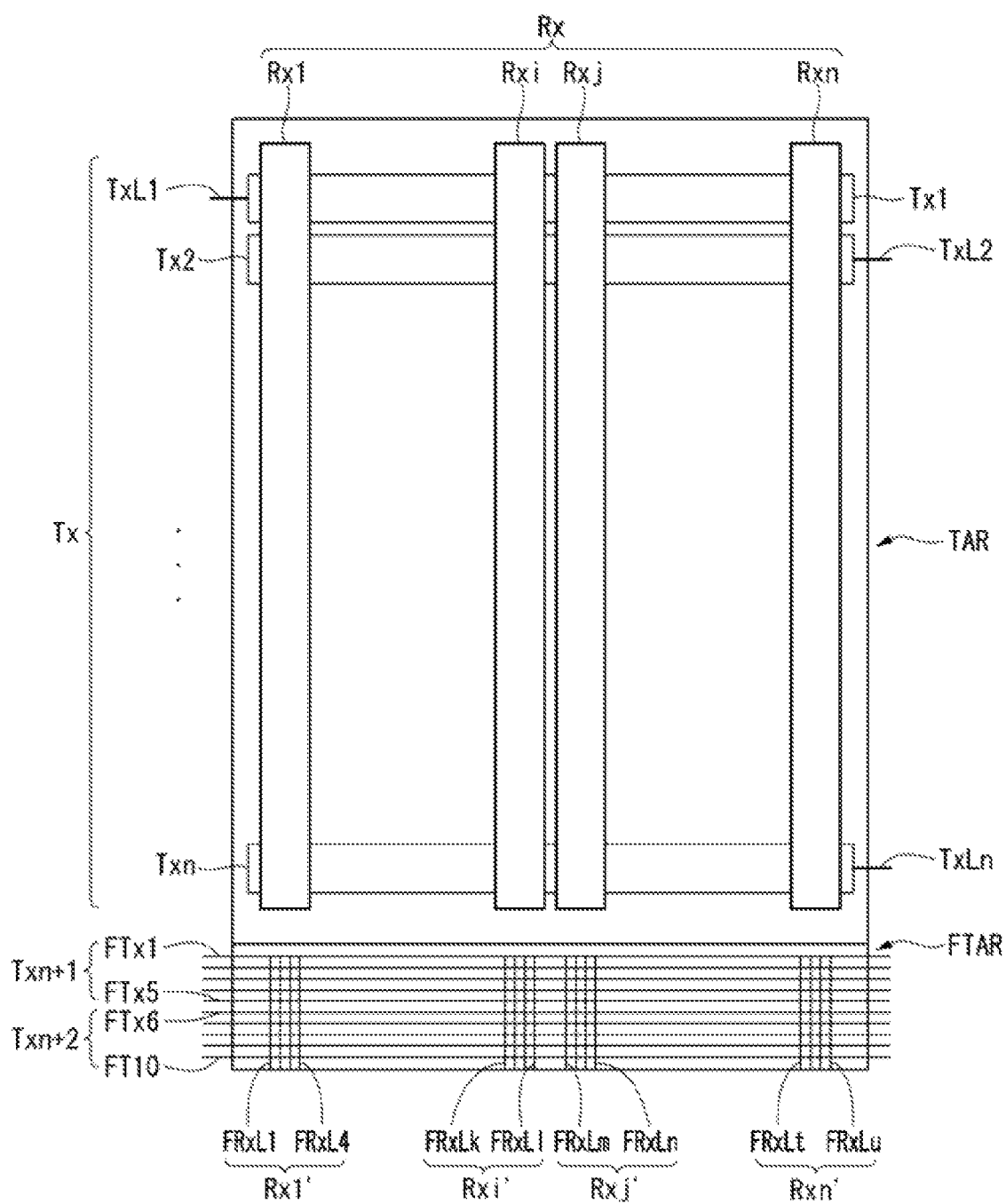
FIG. 13 is a view of the structure of electrodes with respect to the fingerprint and touch area.
Figure 14:
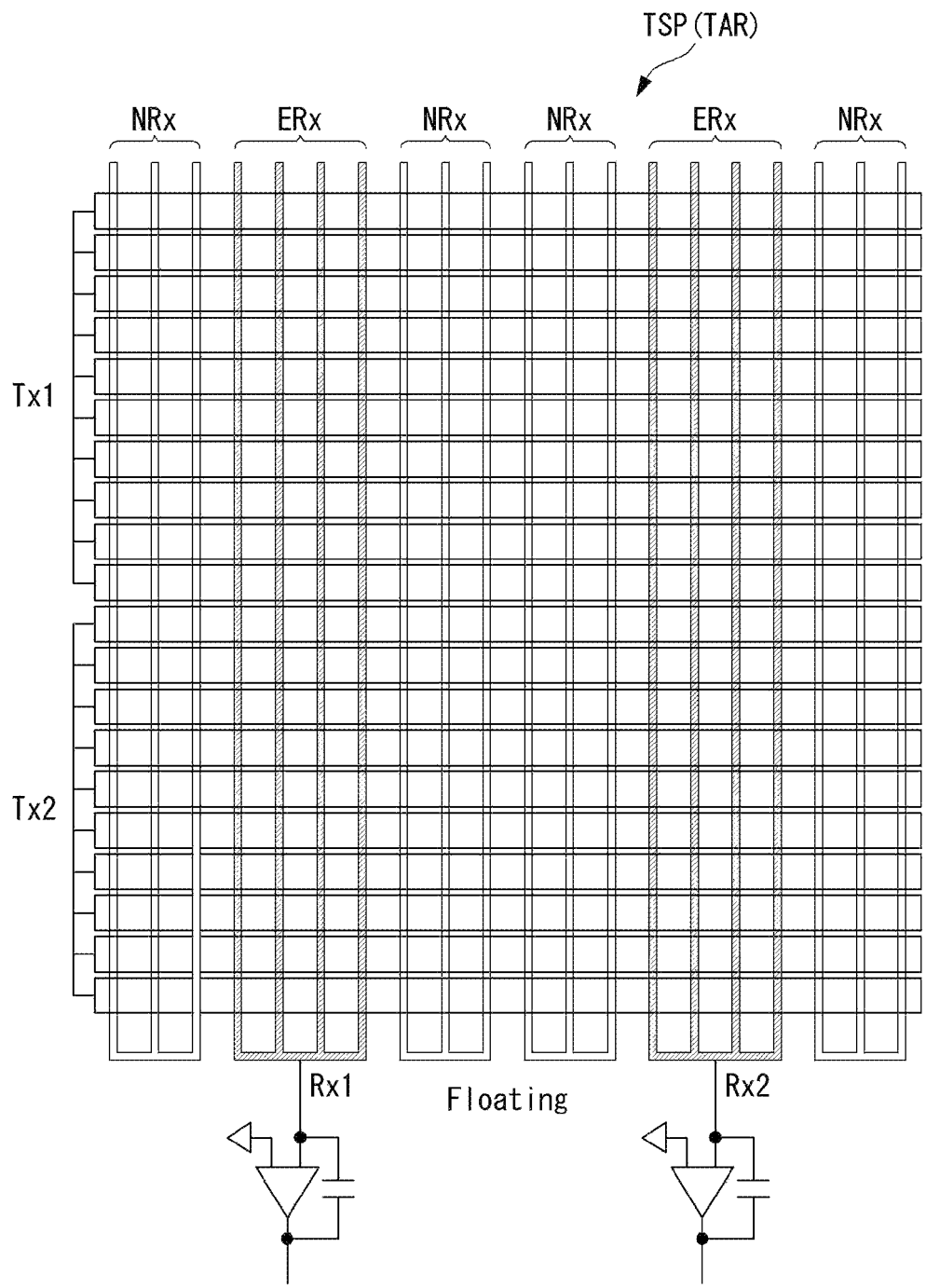
FIGS. 14 and 15 are views showing methods of reducing mutual capacitance.
Figure 15:
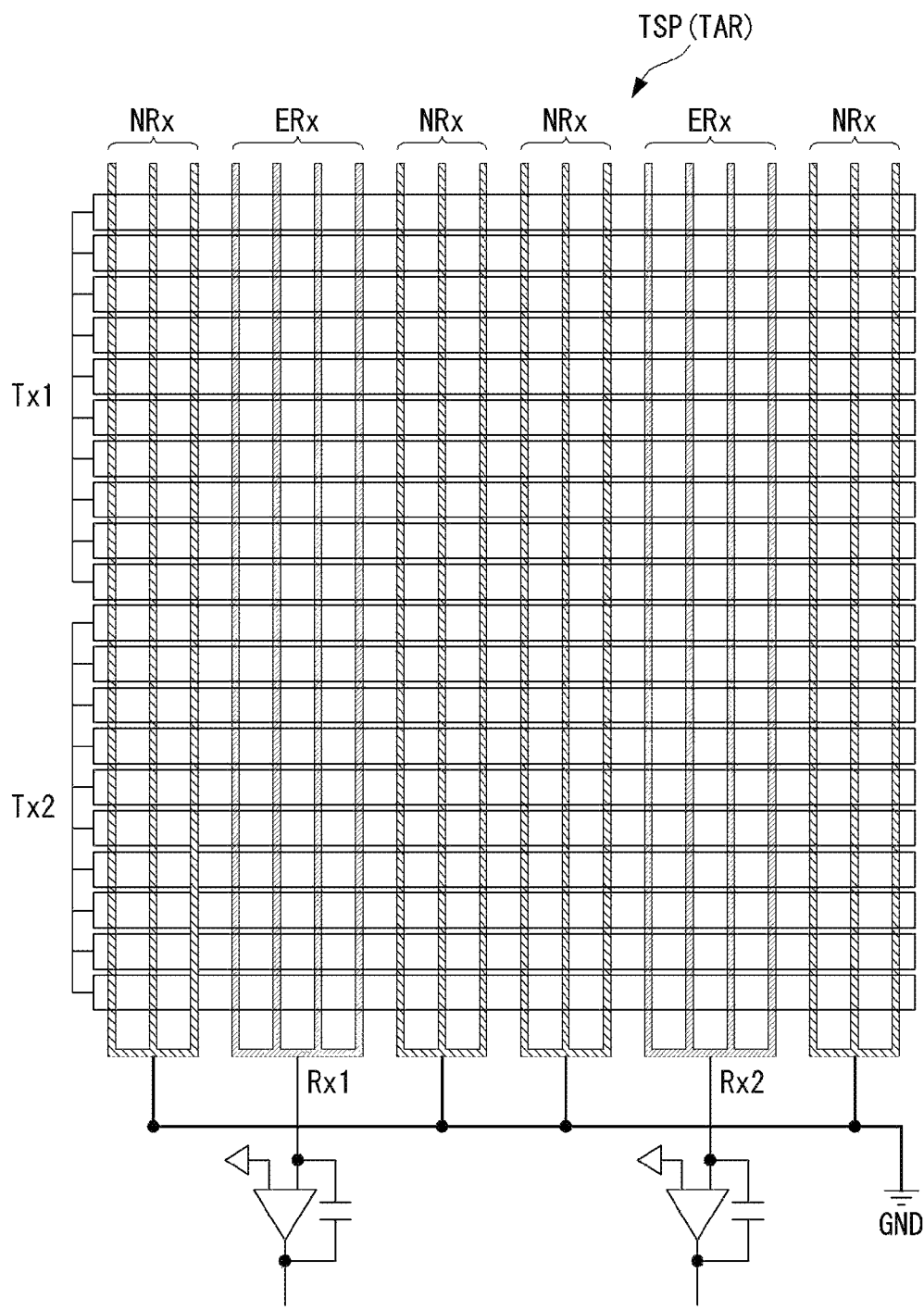

FIG. 9 is a block diagram showing a display device to which a touchscreen device with an integrated fingerprint sensor according to an example embodiment of the present disclosure is applied. FIG. 10 is a view showing the position of a fingerprint and touch area that can be implemented on the touchscreen. FIG. 11 is a view of the structure of electrodes in the touchscreen device with an integrated fingerprint sensor. FIG. 12 is a view of the structure of electrodes with respect to a touch area. FIG. 13 is a view of the structure of electrodes with respect to the fingerprint and touch area. FIGS. 14 and 15 are views showing methods of reducing mutual capacitance.

As shown in FIG. 9, a touchscreen device with an integrated fingerprint sensor according to an example embodiment of the present disclosure is implemented along with a display device. The display device comprises a display panel DIS, display panel drive circuits 12, 14, and 16, and a host system 18. The touchscreen device with an integrated fingerprint sensor comprises a touchscreen TSP and a touch IC 20.

The display panel DIS comprises a liquid crystal layer formed between two substrates. The pixel array on the display panel DIS comprises pixels formed in pixel regions defined by data lines D1 to Dm (m is a positive integer) and gate lines G1 to Gn (n is a positive integer). Each pixel may comprise a TFT (thin film transistor) formed at the intersection of a data line D1 to Dm and a gate line G1 to Gn, a pixel electrode that is charged with a data voltage, and a storage capacitor Cst connected to the pixel electrode to hold the voltage of a liquid crystal cell.

A black matrix, color filters, etc., may be formed on the upper substrate of the display panel DIS. A lower substrate of the display panel DIS may be implemented in a COT (color filter on TFT) structure. In this case, the black matrix and the color filters may be formed on the lower substrate of the display panel DIS. A common electrode to be supplied with a common voltage may be formed on the upper or lower substrate of the display panel DIS. Polarizers are respectively attached to the upper and lower substrates of the display panel DIS, and an alignment film for setting a pre-tilt angle of liquid crystals is formed on an inner surface contacting the liquid crystals. A column spacer is formed between the upper and lower substrates of the display panel DIS to maintain a cell gap for liquid crystal cells.

A backlight unit may be disposed on the back of the display panel DIS. The backlight unit may be implemented as an edge-type or direct-type backlight unit which illuminates the display panel DIS. The display panel DIS may be implemented in any well-known liquid crystal mode, such as a TN (Twisted Nematic) mode, a VA (Vertical Alignment) mode, an IPS (In-Plane Switching) mode, and an FFS (Fringe Field Switching) mode.

The display panel drive circuits 12, 14, and 16 comprise a data drive circuit 12, a scan drive circuit 14, and a timing controller 16, and perform an operation for writing video data of an input image to the pixels on the display panel DIS.

The data drive circuit 12 converts digital video data RGB input from the timing controller 16 to analog positive/negative gamma compensated voltages to output data voltages. The data voltages output from the data drive circuit 12 are fed to the data lines D1 to Dm. The scan drive circuit 14 sequentially supplies gate pulses (or scan pulses) synchronized with data voltages to the gate lines G1 to Gn to select pixel lines from the display panel DIS to write the data voltages to.

The timing controller 16 receives timing signals, such as a vertical synchronization signal Vsync, horizontal synchronization signal Hsync, data enable signal DE, main clock MCLK, etc., input from the host system 18, and synchronizes the operation timings of the data drive circuit 12 and scan drive circuit 14. A scan timing control signal comprises a gate start pulse GSP, a gate shift clock, a gate output enable signal GOE, etc. A data timing control signal comprises a source sampling clock SSC, a polarity control signal POL, a source output enable signal SOE, etc.

The host system 18 may be implemented as any one of the following: a television system, a set-top box, a navigation system, a DVD player, a Blu-ray player, a personal computer PC, a home theater system, and a phone system. The host system 18 comprises a system-on-chip (SoC) having a scaler incorporated in it, and converts digital video data RGB of an input image into a format suitable for display on the display panel DIS. The host system 18 transmits the timing signals Vsync, Hsync, DE, and MCLK, along with the digital video data, to the timing controller 16. Moreover, the host system 18 executes an application associated with a touch report input from the touch IC 20.

The touchscreen TSP is implemented as mutual capacitance type, based on the electrodes included within the display panel DIS. The touchscreen TSP may comprise Tx electrode lines (or Tx channels) arranged side by side in a first direction, Rx electrode lines (or Rx channels) arranged side by side in a second direction and intersecting the Tx electrode lines, and mutual capacitance sensors formed at the intersections of the Tx electrode lines and the Rx electrode lines. Each mutual capacitance sensor comprises a Tx electrodes connected to a Tx electrode line, an Rx electrode connected to an Rx electrode line, and an insulating layer located between the Tx electrode and the Rx electrode. The Tx electrode lines are driving signal wires that apply a sensor driving signal individually to the sensors and supply an electrical charge to the sensors. The Rx electrode lines are sensor wires that are connected to the sensors and supply the electrical charge in the sensors to the touch IC 20. In mutual capacitive sensing, a sensor driving signal is applied to the TX electrode of a mutual capacitance sensor through a Tx electrode line to supply an electrical charge to the mutual capacitance sensor, and touch input can be sensed by sensing a change in the capacitance of the mutual capacitance sensor through the RX electrode and the Rx electrode line, in synchronization with the sensor driving signal.

The touchscreen device TSP has a touch area TAR in which only touch sensing occurs and a fingerprint and touch area FTAR in which touch sensing and fingerprint sensing occur selectively. The fingerprint and touch area FTAR may be defined as in (a) and (b) of FIG. 10 or in other similar configurations. For convenience of explanation, this will be described with respect to (a) of FIG. 10.

The touch IC 20 comprises a driving signal supply part that supplies a sensor driving signal to the Tx electrode lines and a driving signal sensing part that senses the Rx electrode lines. The driving signal sensing part comprises a touch sensing part and a fingerprint sensing part.

The touch IC 20 further comprises a switch block that selectively connects the FRx lines in the fingerprint and touch area FTAR to the touch sensing part or fingerprint sensing part. The switch block performs switching operations inversely in response to a touch enable signal and fingerprint enable signal which are externally applied. The touch IC 20 sends touch coordinate data TDATA and fingerprint recognition data FDATA obtained by sensing to the host system 18.

As shown in FIGS. 9 and 11 to 15, the Tx electrodes Tx1 to Txn and Rx electrodes Rx1 to Rxn arranged in the touch area TAR and the FTx electrodes FTx1 to FTxn and FRx electrodes FRx1 to FRxn arranged in the fingerprint and touch area FTAR are formed in a high-density electrode pattern. The Tx electrodes TX1 to Txn and Rx electrodes Rx1 to Rxn correspond to touch sensing electrodes Tx and Rx, and the FTx electrodes FTx1 to FTxn and FRx electrodes FRx1 to FRxn correspond to fingerprint and touch sensing electrodes FTx and FRx.

The Tx electrodes TX1 to Txn and Rx electrodes Rx1 to Rxn are respectively connected to channels of the touch IC 20 via Tx lines TxL1 to TxLn and Rx lines RxL1 to RxLn, and the FTx electrodes FTx1 to FTxn and FRx electrodes FRx1 to FRxn are respectively connected to the channels of the touch IC 20 via FTx lines FTxL1 to FTxLn and FRx lines FRxL1 to FRxLn.

The Tx electrodes Tx1 to Txn and Rx electrodes Rx1 to Rxn arranged in the touch area TAR perform touch sensing. The Tx electrodes Tx1 to Txn and Rx electrodes Rx1 to Rxn are formed of tiny electrodes. The Tx electrodes Tx1 to Txn work in groups or individually by the switch block present within the touch IC 20.

In contrast, as shown in FIG. 12, the Rx electrodes Rx1 to Rxn form a plurality of groups in the boundary region between the touch area TAR and the fingerprint and touch area FTAR, and the groups are individually and separately connected to the Rx lines RxL1 to RxLn. For example, a plurality of Rx electrodes form a group, i.e., the 1Rx electrode Rx1, and the 1Rx electrode Rx1 is connected to the 1Rx line RxL1 in the boundary region between the touch area TAR and the fingerprint and touch area FTAR.

That is, the Rx electrodes Rx1 to Rxn arranged in the touch area TAR have a physically connected structure so that they work in groups in the boundary region between the touch area TAR and the fingerprint and touch area FTAR. Also, the Rx lines RxL1 to RxLn are arranged to pass across the FRx electrodes FRx1 to FRxn arranged in the fingerprint and touch area FTAR and connect to the touch IC 20.

Figure 18:
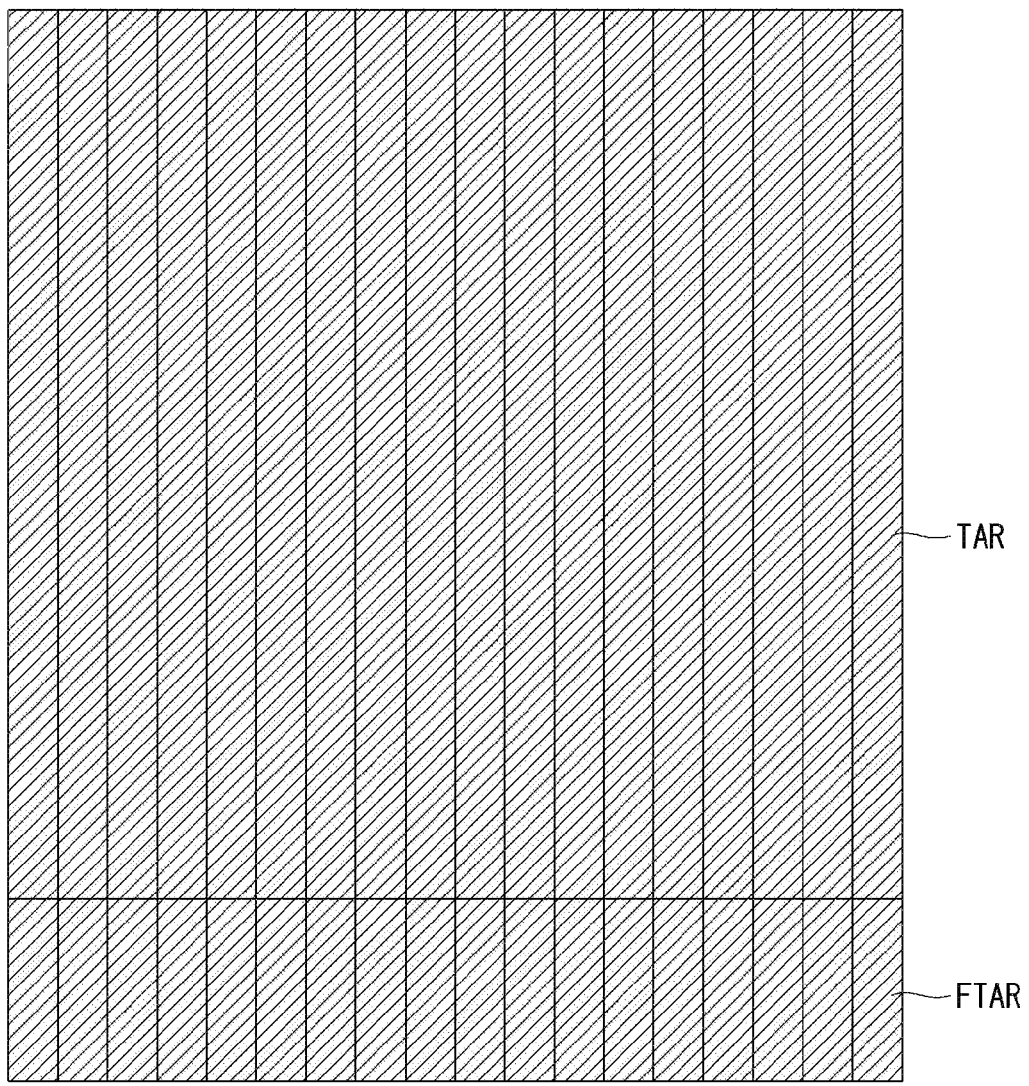
FIG. 18 is a view for explaining an improvement achieved by the example embodiment.

With the above structure of the Rx electrodes Rx1 to Rxn, Cm/Cp that may occur between the Rx electrodes Rx1 to Rxn and the FRx electrodes FRx1 to FRxn is reduced considerably. As a result, it was revealed that the problem of Cm/Cp non-uniformity, which may occur because of the coexistence of touch sensing electrodes and fingerprint sensing electrodes, was significantly reduced compared to the test example. A test result about this is shown in FIG. 18.

The Tx electrodes Tx1 to Txn and Rx electrodes Rx1 to Rxn arranged in the touch area TAR do not require as high a resolution as required for fingerprint sensing. Thus, the Tx electrodes Tx1 to Txn and Rx electrodes Rx1 to Rxn arranged in the touch area TAR form groups for different areas, and the group of electrodes in the same area are simultaneously driven and sensed. Because of the above operation, the power consumption and touch report rate of the touchscreen device TSP with an integrated fingerprint sensor are reduced.

The 1Tx electrode Tx1 shown in the drawing represents a group of tiny electrodes formed by electrical shorting. Like the 1Tx electrode Tx1, each of the other Tx electrodes Tx2 to Txn arranged in the touch area TAR represents a group of tiny electrodes formed by electrical shorting. While the Tx electrodes Tx1 to Txn form groups of tiny electrodes for different areas by electrical shorting, the Rx electrodes Rx1 to Rxn form groups of tiny electrodes for different areas by physical shorting.

The FTx electrodes FTx1 to FTxn and FRx electrodes FRx1 to FRxn arranged in the fingerprint and touch area FTAR perform fingerprint sensing or touch sensing. The FTx electrodes FTx1 to FTxn and FRx electrodes FRx1 to FRxn arranged in the fingerprint and touch area FTAR are formed of tiny electrodes. The FTx electrodes FTx1 to FTxn and FRx electrodes FRx1 to FRxn work in groups or individually by the switch block present within the touch IC 20.

When performing touch sensing, the FTx electrodes FTx1 to FTxn and FRx electrodes FRx1 to FRxn arranged in the fingerprint and touch area FTAR form groups for different areas, and the group of electrodes in the same area are simultaneously driven and sensed.

When performing touch sensing, 1FTx to 5FTx electrodes FTx1 to FTx5 become a Txn+1 electrode Txn+1 and a Txn+1 line as the 1FTxL1 to 5FTxL5 lines FTxL1 to FTxL5 are clustered together by the switch block present within the touch IC 20. Also, 1FRx to 4FRx electrodes FRx1 to FRx4 become an Rx1' electrode Rx1' and an Rx1' line as the 1FRxL1 to 4FRxL4 lines FRxL1 to FRxL4 are clustered together by the switch block present within the touch IC 20.

In this way, 1FTX to 10FTx electrodes FTx1 to FTx10 become a Txn+1 electrode Txn+1 and a Txn+2 electrode Txn+2, and 1FRx to uFRx electrodes FRx1 to FRxu become Rx1' to Rxn' electrodes Rx1 to Rxn'. Although the drawings illustrate an example in which the 1FTX to 10FTx electrodes FTx1 to FTx10 form two Tx electrodes and two Tx lines, this is merely for illustration. The 1FRx to uFRx electrodes FRx1 to FRxu have innumerable electrodes and lines, and the number of tiny electrodes constituting them is similar or equal to the number of tiny electrodes constituting the 1Rx to nRx electrodes Rx1 to Rxn. The same applies to the Tx lines and the FTx lines.

When performing fingerprint sensing, the FTx electrodes FTx1 to FTxn and FRx electrodes FRx1 to FRxn arranged in the fingerprint and touch area FTAR require a high resolution. Thus, they do not work in groups but are individually driven and sensed. In this way, the FTx electrodes FTx1 to FTxn and FRx electrodes FRx1 to FRxn arranged in the fingerprint and touch area FTAR are micropatterned so that many of them fit between fingerprint ridges and valleys, and perform sensing at high resolution, thereby enabling accurate fingerprint sensing.

As shown in FIG. 14, the touch IC 20 may perform a first switching operation for reducing mutual capacitance when performing touch sensing on the touch area TAR. To this end, the touch IC 20 controls the switch block such that only effective channels ERx are sensed while non-effective channels NRx are electrically floating.

As shown in FIG. 15, the touch IC 20 may perform a second switching operation for reducing mutual capacitance when performing touch sensing on the touch area TAR. To this end, the touch IC 20 controls the switch block such that only effective channels ERx are sensed while non-effective channels NRx are connected to a ground voltage source GND.

Since the operations of FIGS. 14 and 15 are done when touch sensing is performed, they can be applied equally to the fingerprint and touch area FTAR, as well as the touch area TAR. Also, all the channels in the touch area TAR may be connected to the ground voltage source GND when fingerprint sensing is performed through the fingerprint and touch area FTAR. In this case, Cp, as well as mutual capacitance, can be reduced, thereby improving the accuracy of fingerprint sensing.

A detailed description will be given below about touch sensing and fingerprint sensing that are performed in the fingerprint and touch area FTAR.

Figure 16:
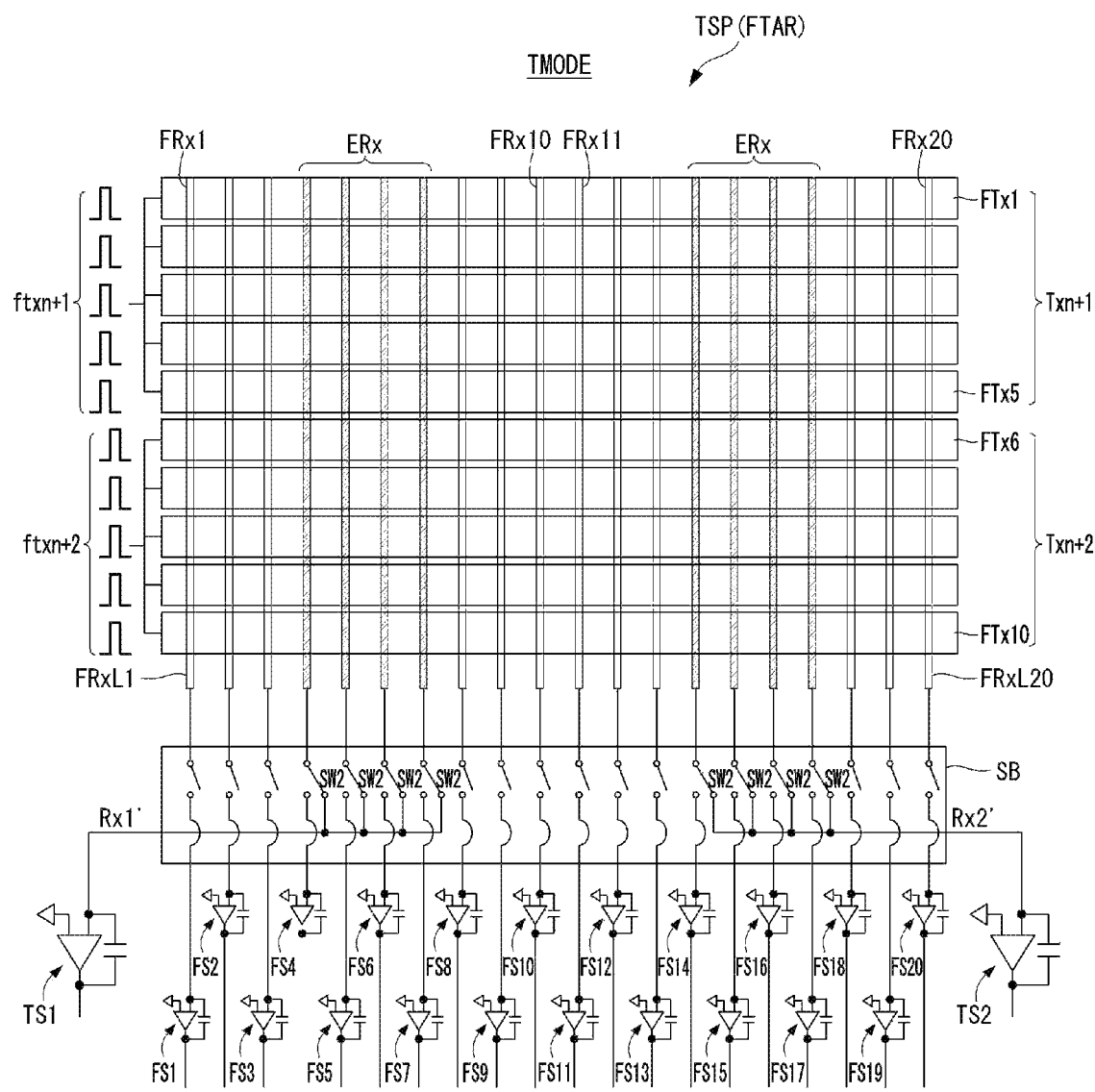
FIG. 16 is a view for explaining touch sensing mode in which touch sensing is performed.
Figure 17:
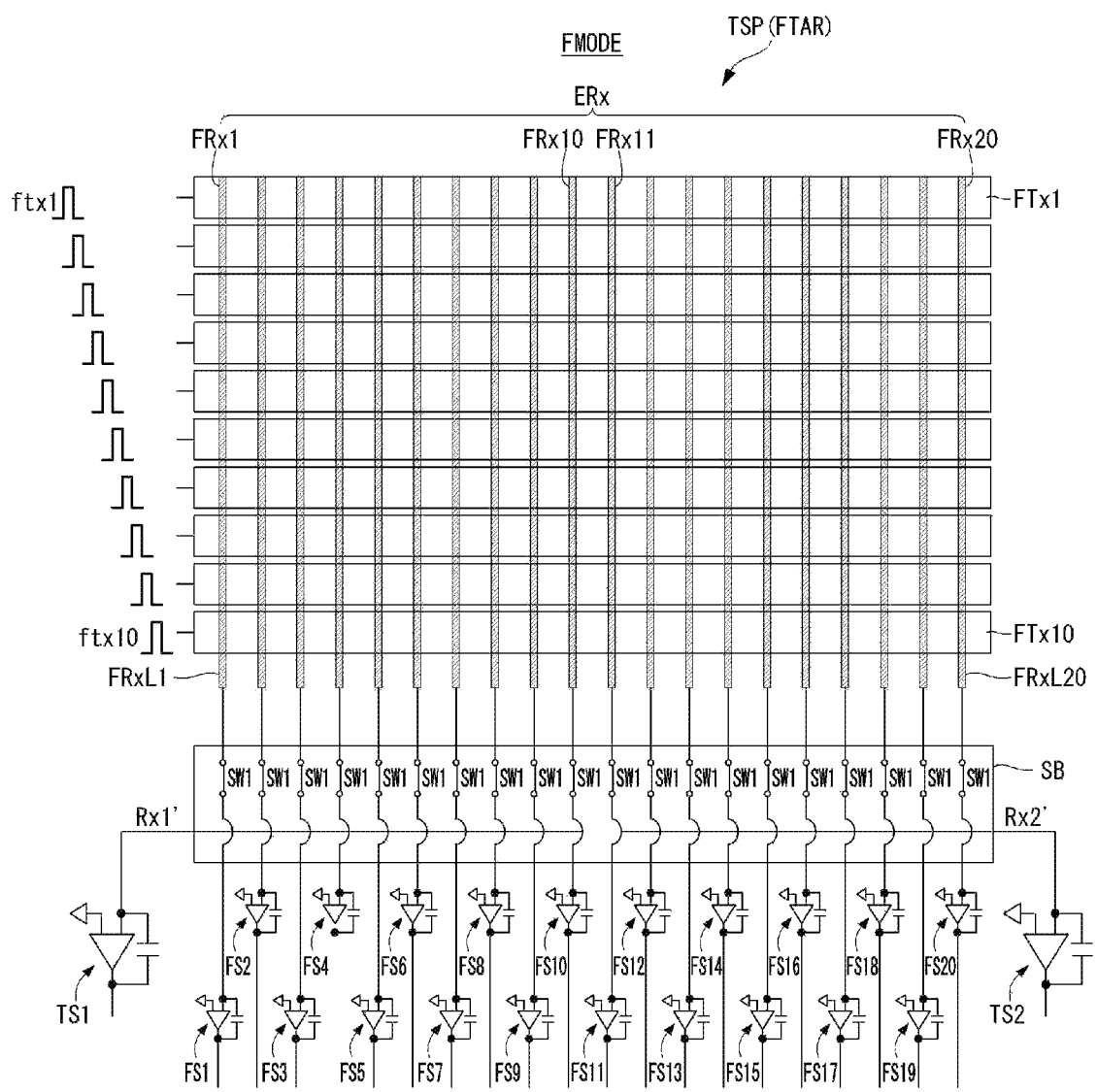
FIG. 17 is a view for explaining fingerprint sensing mode in which fingerprint sensing is performed.

FIG. 16 is a view for explaining touch sensing mode in which touch sensing is performed. FIG. 17 is a view for explaining fingerprint sensing mode in which fingerprint sensing is performed. FIG. 18 is a view for explaining an improvement achieved by the example embodiment.

As shown in FIGS. 10 and 16, during touch sensing mode TMODE in which touch sensing is performed, the FTx electrodes FTx1 to FTx10 are sequentially driven in two groups. Due to this, the FTx electrodes FTx1 to FTx5 belonging to a 1FTx group receive an FTXn+1 sensor driving signal ftxn+1 of the same waveform (same phase waveform). The FTx electrodes FTx6 to FTx10 belonging to a 2FTx group receive an FTxn+2 sensor driving signal ftxn+2 of the same waveform (same phase waveform). This is based on an example in which the FTXn+1 sensor driving signal ftxn+1 is output at logic high before the FTXn+2 sensor driving signal ftxn+2, but the present disclosure is not limited to this.

During touch sensing mode TMODE in which touch sensing is performed, the switch block SB is controlled such that only effective channels ERx are sensed, which will be described below. The description is based on an example in which the second switches SW2 of the switch block SB are turned on to sense only four FRx electrodes defined as effective channels ERx in response to a touch enable signal.

However, the present disclosure is not limited to this example since a plurality of FRx electrodes are included as effective channels ERx.

During touch sensing mode TMODE in which touch sensing is performed, the second switches SW2 of the switch block SB are turned on. Once the second switches SW2 of the switch block SB are turned on, only four of the 1FRx to 10FRx electrodes FRx1 to FRx10, corresponding to effective channels ERx, form a group. The four FRx electrodes are defined by one Rx1' electrode Rx1' or one Rx1' line. The first touch sensing part TS1 is electrically connected to the one Rx1' electrode Rx1' or one Rx1' line, thereby sensing a first group.

Once the second switches SW2 of the switch block SB are turned on, only four of the 11FRx to 20FRx electrodes FRx11 to FRx20, corresponding to effective channels ERx, form a group. The four FRx electrodes are defined by one Rx2' electrode Rx2' or one Rx2' line. The second touch sensing part TS2 is electrically connected to the one Rx2' electrode Rx2' or one Rx2' line, thereby sensing a second group.

When the second switches SW2 of the switch block SB are turned on, the first and second touch sensing parts TS1 and TS2 perform sensing operation but first to twelfth fingerprint sensing parts FS1 to FS20 do not perform sensing operation. Moreover, the FRx electrodes (or ineffective channels) not included as effective channels ERx go into a floating state or are connected to the ground voltage source.

As shown in FIGS. 10 and 17, during fingerprint sensing mode FMODE in which fingerprint sensing is performed, the FTx electrodes FTx1 to FTx10 are individually and sequentially driven. Due to this, the FTx electrodes FTx1 to FTx10 receive FTX1 to FTX10 sensor driving signals ftxn1 to ftx10 of different waveforms (sequentially delayed waveforms). This is based on an example in which the FTX1 sensor driving signal ftx1 is output at logic high before the FTX2 sensor driving signal ftx2, but the present disclosure is not limited to this. Likewise, two successive sensor driving signals may have a difference of a first period.

During fingerprint sensing mode FMODE in which fingerprint sensing is performed, the switch block SB is controlled to sense all channels, which will be described below.

During fingerprint sensing mode FMODE in which fingerprint sensing is performed, the first switches SW1 of the switch block SB are turned on. Once the first switches SW1 of the switch block SB are turned on, sensing operation is performed on each of the 1FRx to 20FRX electrodes FRx1 to FRx20.

The first fingerprint sensing part FS1 is electrically connected to the 1FRx electrode FRx1 connected to the 1FRx line FRxL1 and therefore performs sensing. In this way, the first fingerprint sensing part FS1 to twelfth fingerprint sensing part FS20 sense the 1FRx electrode FRx1 to 20FRx electrode FRx20. The first fingerprint sensing part FS1 to twelfth fingerprint sensing part FS20 may perform simultaneous sensing or sequential sensing.

When the first switches SW1 of the switch block SB are turned on, the first to twelfth fingerprint sensing parts FS1 to FS20 perform sensing operation but the first and second touch sensing parts TS1 and TS2 do not perform sensing operation.

As above, in the example embodiment of the present invention, the Rx electrodes are designed to be separated into a touch electrode portion (or general electrode sensor portion) and a fingerprint and touch electrode portion (or tiny electrode sensor portion) and the same type of electrodes have uniform Cm/Cp. As a result, as can be seen from FIG. 18, the touchscreen device with an integrated fingerprint sensor according to the example embodiment of the present disclosure has a total of two sensing areas, and Cm/Cp is uniform between these areas, thereby improving the performance and sensitivity of the fingerprint sensor as well as touch performance.

Even with the use of the above-described method according to the example embodiment, the Cm/Cp non-uniformity problem may still occur depending on the structure or driving method of the touchscreen device with an integrated fingerprint sensor or of the display device.

Figure 19:
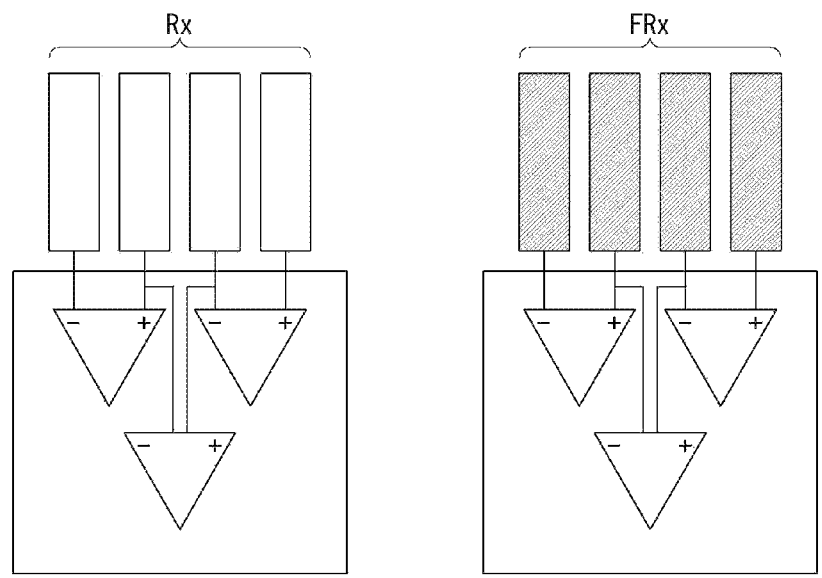
FIG. 19 is a view for explaining a solution for overcoming non-uniformity in parasitic capacitance.
Figure 20:
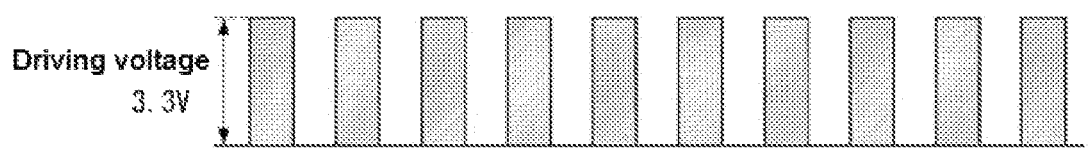
FIGS. 20 and 21 are views for explaining a solution for overcoming non-uniformity in mutual capacitance.
Figure 21:
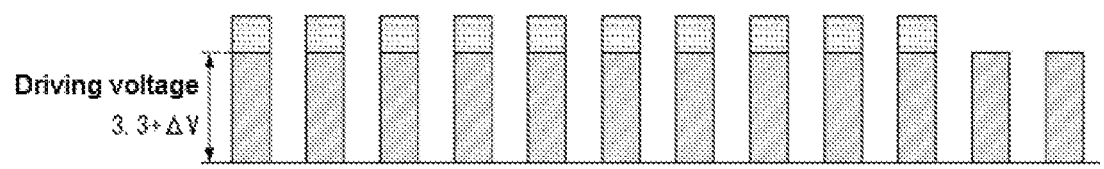

FIG. 19 is a view for explaining a solution for overcoming non-uniformity in parasitic capacitance. FIGS. 20 and 21 are views for explaining a solution for overcoming non-uniformity in mutual capacitance.

According to another example embodiment of the present invention, the Rx electrodes are separated into a touch electrode portion Rx (or general electrode sensor portion) and a fingerprint and touch electrode portion (or tiny electrode sensor portion). Although the touch electrode portion Rx and the fingerprint and touch electrode portion FRx are separated and defined by the above-described structure of the example embodiment, the Cm/Cp non-uniformity problem may occur depending on the structure or driving method of the touchscreen device with an integrated fingerprint sensor or of the display device.

However, using the following method, touch sensing and fingerprint sensing may be performed in a way appropriate for the structure or driving method of the touchscreen device with an integrated fingerprint sensor or of the display device, thus solving the Cm/Cp non-uniformity problem.

[Solution for Overcoming Non-Uniformity in Parasitic Capacitance]

In another example embodiment of the present invention, as shown in FIG. 19, a touch sensing part sensing the touch electrode portion Rx and a fingerprint sensing part sensing the fingerprint and touch electrode portion FRx are implemented based on OP-amps as differential amplifiers. The OP-amps as differential amplifiers help solve the problem of non-uniformity in parasitic capacitance Cp because they amplify differential input only and the common-mode signal gain is zero.

[Solution for Overcoming Non-Uniformity in Mutual Capacitance]

In another example embodiment of the present invention, as shown in FIG. 20, the touch IC is implemented in such a way that sensor driving signals with a driving voltage of 3.3 V, for example, are cumulatively sensed and a touch sensing result or fingerprint sensing result is derived from the cumulative number of times of sensing. In yet another example embodiment of the present invention, as shown in FIG. 21, the touch IC is implemented in such a way that sensor driving signals have a driving voltage of 3.3 V, for example, and the touch area TAR and the fingerprint and touch area FTR are driven and sensed by varying the driving voltage.

As discussed above, the present disclosure has the advantage of improving the performance and sensitivity of the fingerprint sensor as well as touch performance since the Rx electrodes are designed to be physically separated into a touch electrode portion and a fingerprint and touch electrode portion to ensure uniform Cm/Cp. Another advantage of the present disclosure is that the Cm/Cp non-uniformity problem can be solved by performing touch sensing and fingerprint sensing in a way appropriate for the structure or driving method of the touchscreen device with an integrated fingerprint sensor or of the display device.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touchscreen device with an integrated fingerprint sensor, the touchscreen device comprising:
    a touchscreen having a touch area for touch sensing and a fingerprint and touch area for touch sensing and fingerprint sensing, the touch area having driving electrodes arranged in a first direction and sensing electrodes arranged in a second direction, and the fingerprint and touch area having fingerprint driving electrodes arranged in the first direction and fingerprint sensing electrodes arranged in the second direction, wherein a distance between two neighboring fingerprint sensing electrodes in the fingerprint and touch area have a smaller distance than a distance between two neighboring sensing electrodes in the touch area;
    a touch integrated circuit that performs touch sensing through the touch area and the fingerprint and touch area and performs fingerprint sensing through the fingerprint and touch area; and
    sensing lines connecting the sensing electrodes to the touch integrated circuit that overlap the fingerprint sensing electrodes arranged in the fingerprint and touch area, wherein at least one of the sensing lines that overlap the fingerprint and touch area do not perform touch sensing or fingerprint sensing for the fingerprint and touch area, the sensing lines including a first sensing line and a second sensing line, the first sensing line and the second sensing line being individual and separate from each other,
    wherein the sensing electrodes form a plurality of sensing electrode groups, and the sensing electrode groups are individually and separately connected to the respective sensing lines at the boundary region between the touch area and the fingerprint and touch area,
    wherein the sensing electrode groups include a first sensing electrode group and a second sensing electrode group, and the first and the second sensing electrode group includes at least two sensing electrodes electrically connected to each other respectively,
    wherein the first sensing line is electrically connected to one of the at least two sensing electrodes of the first sensing electrode group and the second sensing line is electrically connected to one of the at least two sensing electrodes of the second sensing electrode group.

2. The touchscreen device of claim 1, wherein the fingerprint driving electrodes and the fingerprint sensing electrodes work in groups when performing touch sensing and work individually when performing fingerprint sensing.

3. The touchscreen device of claim 2, wherein the fingerprint driving electrodes and the fingerprint sensing electrodes form groups by electrical shorting.

4. The touchscreen device of claim 1, wherein the fingerprint sensing electrodes work in groups or individually in response to an operation of a switch block included within the touch integrated circuit.

5. The touchscreen device of claim 4, wherein the switch block comprises:
    first switches that are turned on in response to a fingerprint enable signal and connect the fingerprint sensing electrodes to input terminals of fingerprint sensing parts; and
    second switches that are turned on in response to a touch enable signal and connects the sensing electrodes to input terminals of touch sensing parts.

6. The touchscreen device of claim 5, wherein the first switches and the second switches perform switching operations inversely to each other in response to the touch enable signal and the fingerprint enable signal.

7. The touchscreen device of claim 1, wherein the sensing electrode groups always work in groups by the sensing lines arranged on the touchscreen, and the driving electrodes work in groups only when performing touch sensing.

8. The touchscreen device of claim 1, wherein, when performing fingerprint sensing, the touch integrated circuit connects a plurality of channels connected to the sensing electrode groups to a ground voltage source.

9. The touchscreen device of claim 1, wherein, when performing touch sensing, the touch integrated circuit defines some of the sensing electrode groups as effective channels and some of the remaining sensing electrode groups as ineffective channels, and connects the ineffective channels to the ground voltage source.

10. The touchscreen device of claim 1, wherein, when performing touch sensing, the touch integrated circuit defines some of the sensing electrode groups as effective channels and some of the remaining sensing electrode groups as ineffective channels, and brings the ineffective channels into an electrically floating state.

11. The touchscreen device of claim 1, wherein the touch integrated circuit supplies sensor driving signals of the same phase to the driving electrodes when performing touch sensing, and supplies sensor driving signals of sequentially delayed phases to the fingerprint driving electrodes.

12. The touchscreen device of claim 1, wherein the touchscreen is implemented as mutual capacitance type, based on electrodes included within a display panel.

13. A touchscreen device with an integrated fingerprint sensor, the touchscreen device comprising:
    a touchscreen having a touch area for touch sensing and a fingerprint and touch area for touch sensing and fingerprint sensing, the touch area having driving electrodes arranged in a first direction and sensing electrodes arranged in a second direction, and the fingerprint and touch area having fingerprint driving electrodes arranged in the first direction and fingerprint sensing electrodes arranged in the second direction, wherein a distance between two neighboring fingerprint sensing electrodes in the fingerprint and touch area have a smaller distance than a distance between two neighboring sensing electrodes in the touch area;
    a touch integrated circuit that performs touch sensing through the touch area and the fingerprint and touch area and performs fingerprint sensing through the fingerprint and touch area; and sensing lines connecting the sensing electrodes to the touch integrated circuit passes across the fingerprint sensing electrodes arranged in the fingerprint and touch area, the sensing lines including a first sensing line and a second sensing line, the first sensing line and the second sensing line being individual and separate from each other, wherein the sensing electrodes form a plurality of sensing electrode groups, and the sensing electrode groups are individually and separately connected to the respective sensing lines at the boundary region between the touch area and the fingerprint and touch area, wherein the sensing electrode groups include a first sensing electrode group and a second sensing electrode group, and the first and the second sensing electrode group includes at least two sensing electrodes electrically connected to each other respectively, wherein the first sensing line is electrically connected to one of the at least two sensing electrodes of the first sensing electrode group and the second sensing line is electrically connected to one of the at least two sensing electrodes of the second sensing electrode group, wherein the sensing electrode groups always simultaneously perform sensing in groups by the sensing lines arranged on the touchscreen, and the driving electrodes simultaneously perform driving in groups only when performing touch sensing.

14. The touchscreen device of claim 13, wherein the fingerprint driving electrodes and the fingerprint sensing electrodes work in groups when performing touch sensing and work individually when performing fingerprint sensing.

15. The touchscreen device of claim 13, wherein the fingerprint sensing electrodes work in groups or individually in response to an operation of a switch block included within the touch integrated circuit.

16. The touchscreen device of claim 15, wherein the switch block comprises:

first switches that are turned on in response to a fingerprint enable signal and connect the fingerprint sensing electrodes to input terminals of fingerprint sensing parts; and second switches that are turned on in response to a touch enable signal and connects the sensing electrodes to input terminals of touch sensing parts.

17. The touchscreen device of claim 13, wherein, when performing fingerprint sensing, the touch integrated circuit connects a plurality of channels connected to the sensing electrode groups to a ground voltage source.

18. The touchscreen device of claim 13, wherein, when performing touch sensing, the touch integrated circuit defines some of the sensing electrode groups as effective channels and some of the remaining sensing electrode groups as ineffective channels, and connects the ineffective channels to the ground voltage source.

19. The touchscreen device of claim 13, wherein, when performing touch sensing, the touch integrated circuit defines some of the sensing electrode groups as effective channels and some of the remaining sensing electrode groups as ineffective channels, and brings the ineffective channels into an electrically floating state.

20. The touchscreen device of claim 13, wherein the touch integrated circuit supplies sensor driving signals of the same phase to the driving electrodes when performing touch sensing, and supplies sensor driving signals of sequentially delayed phases to the fingerprint driving electrodes.

* * * * *